US008292180B2

(12) United States Patent
Ehrhart et al.

(10) Patent No.: US 8,292,180 B2
(45) Date of Patent: Oct. 23, 2012

(54) OPTICAL READER HAVING AN IMAGER

(75) Inventors: Michael A. Ehrhart, Liverpool, NY (US); Andrew Longacre, Jr., Skaneateles, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 13/195,760

(22) Filed: Aug. 1, 2011

(65) Prior Publication Data
US 2011/0284638 A1 Nov. 24, 2011

Related U.S. Application Data

(60) Division of application No. 12/748,076, filed on Mar. 26, 2010, which is a continuation of application No. 12/188,804, filed on Aug. 8, 2008, now Pat. No. 7,686,222, which is a division of application No. 11/592,636, filed on Nov. 3, 2006, now Pat. No. 7,413,127, which is a division of application No. 10/764,741, filed on Jan. 26, 2004, now Pat. No. 7,287,697, which is a continuation of application No. 09/904,697, filed on Jul. 13, 2001, now Pat. No. 6,722,569.

(51) Int. Cl.
*G06K 7/10* (2006.01)
(52) U.S. Cl. .............. 235/462.02; 235/472.01
(58) Field of Classification Search .......... 235/462.01–462.47, 472.01, 472.02, 235/472.03
See application file for complete search history.

(56) References Cited

U.S. PATENT DOCUMENTS

| | | | |
|---|---|---|---|
| 3,684,868 A | 8/1972 | Christie et al. |
| 3,716,699 A | 2/1973 | Eckert, Jr. et al. |
| 3,801,775 A | 4/1974 | Acker |
| 3,902,047 A | 8/1975 | Tyler et al. |
| 4,020,463 A | 4/1977 | Himmel |
| 4,286,255 A | 8/1981 | Sly |
| 4,335,303 A | 6/1982 | Call |
| 4,387,298 A | 6/1983 | Petersen et al. |
| 4,499,372 A | 2/1985 | Nakano |
| 4,516,017 A | 5/1985 | Hara et al. |
| 4,530,584 A | 7/1985 | Schmidt |
| 4,544,064 A | 10/1985 | Felder |
| 4,562,592 A | 12/1985 | Chainer et al. |
| 4,581,762 A | 4/1986 | Lapidus et al. |
| 4,588,211 A | 5/1986 | Greene |

(Continued)

FOREIGN PATENT DOCUMENTS

EP 0350933 A2 1/1990

(Continued)

OTHER PUBLICATIONS

European Patent Office, European Patent Application No. 02752328.1, Brief Communication, dated Apr. 1, 2011 (1 page).

(Continued)

*Primary Examiner* — Thien M Le
(74) *Attorney, Agent, or Firm* — Heslin Rothenberg Farley & Mesiti P.C.

(57) ABSTRACT

There is described a device having a two dimensional imager. The device having a two dimensional image sensor can be a hand held device. Imaging optics can be provided for focusing light reflected from a target onto the two dimensional imager. An image including imaging data can be obtained utilizing the hand held device.

14 Claims, 17 Drawing Sheets

U.S. PATENT DOCUMENTS

| | | | |
|---|---|---|---|
| 4,656,591 A | 4/1987 | Goldberg | |
| 4,760,248 A | 7/1988 | Swartz et al. | |
| 4,776,464 A | 10/1988 | Miller et al. | |
| 4,794,239 A | 12/1988 | Allais | |
| 4,806,776 A | 2/1989 | Kley | |
| 4,832,204 A | 5/1989 | Handy et al. | |
| 4,835,372 A | 5/1989 | Gombrich et al. | |
| 4,855,842 A | 8/1989 | Hayes et al. | |
| 4,858,000 A | 8/1989 | Lu | |
| 4,868,757 A | 9/1989 | Gil | |
| 4,873,426 A | 10/1989 | Sarna et al. | |
| 4,877,948 A | 10/1989 | Krueger | |
| 4,877,949 A | 10/1989 | Danielson et al. | |
| 4,924,078 A | 5/1990 | Sant'Anselmo et al. | |
| 4,948,955 A | 8/1990 | Lee et al. | |
| 4,963,756 A | 10/1990 | Quan et al. | |
| 4,972,494 A | 11/1990 | White et al. | |
| 4,983,818 A | 1/1991 | Knowles | |
| 5,010,241 A | 4/1991 | Butterworth | |
| 5,019,699 A | 5/1991 | Koenck | |
| 5,038,391 A | 8/1991 | Yamaguchi | |
| 5,039,847 A | 8/1991 | Morii et al. | |
| 5,043,908 A | 8/1991 | Manduley et al. | |
| 5,050,223 A | 9/1991 | Sumi | |
| 5,054,102 A | 10/1991 | Gaborski | |
| 5,070,805 A | 12/1991 | Plante | |
| 5,089,455 A | 2/1992 | Ketcham et al. | |
| 5,091,975 A | 2/1992 | Berger et al. | |
| 5,102,110 A | 4/1992 | Reynolds | |
| 5,103,489 A | 4/1992 | Miette | |
| 5,108,612 A | 4/1992 | Flaig et al. | |
| 5,119,433 A | 6/1992 | Will | |
| 5,120,940 A | 6/1992 | Willsie | |
| 5,134,669 A | 7/1992 | Keogh et al. | |
| 5,138,140 A | 8/1992 | Siemiatkowski et al. | |
| 5,138,141 A | 8/1992 | Blanford et al. | |
| 5,180,904 A | 1/1993 | Shepard et al. | |
| 5,199,081 A | 3/1993 | Saito et al. | |
| 5,199,084 A | 3/1993 | Kishi et al. | |
| 5,212,777 A | 5/1993 | Gove et al. | |
| 5,237,161 A | 8/1993 | Grodevant | |
| 5,237,625 A | 8/1993 | Yamashita et al. | |
| 5,243,655 A | 9/1993 | Wang | |
| 5,260,554 A | 11/1993 | Grodevant | |
| 5,262,623 A | 11/1993 | Batterman et al. | |
| 5,262,871 A | 11/1993 | Wilder et al. | |
| 5,278,399 A | 1/1994 | Sano | |
| 5,291,243 A | 3/1994 | Hackman et al. | |
| 5,296,689 A | 3/1994 | Reddersen et al. | |
| 5,296,690 A | 3/1994 | Chandler et al. | |
| 5,296,960 A | 3/1994 | Ellingson et al. | |
| 5,299,116 A | 3/1994 | Owens et al. | |
| 5,301,243 A | 4/1994 | Olschafskie et al. | |
| 5,304,423 A | 4/1994 | Niknafs et al. | |
| 5,304,786 A | 4/1994 | Pavlidis et al. | |
| 5,305,122 A | 4/1994 | Hayashi et al. | |
| 5,307,423 A | 4/1994 | Gupta et al. | |
| 5,313,051 A | 5/1994 | Brigida et al. | |
| 5,317,388 A | 5/1994 | Surka et al. | |
| 5,331,151 A | 7/1994 | Cochran et al. | |
| 5,331,176 A | 7/1994 | Sant'Anselmo et al. | |
| 5,337,361 A | 8/1994 | Wang et al. | |
| 5,354,977 A | 10/1994 | Roustaei | |
| 5,365,048 A | 11/1994 | Komiya et al. | |
| 5,375,226 A | 12/1994 | Sano et al. | |
| 5,378,883 A | 1/1995 | Batterman et al. | |
| 5,392,447 A | 2/1995 | Schlack et al. | |
| 5,396,054 A | 3/1995 | Krichever et al. | |
| 5,399,846 A | 3/1995 | Pavlidis et al. | |
| 5,410,141 A | 4/1995 | Koenck et al. | |
| 5,413,383 A | 5/1995 | Laurash et al. | |
| 5,414,251 A | 5/1995 | Durbin | |
| 5,420,403 A | 5/1995 | Allum et al. | |
| 5,420,943 A | 5/1995 | Mak | |
| 5,421,778 A | 6/1995 | Kouramanis | |
| 5,422,470 A | 6/1995 | Kubo | |
| 5,428,211 A | 6/1995 | Zheng et al. | |
| 5,428,212 A | 6/1995 | Tani et al. | |
| 5,448,375 A | 9/1995 | Cooper et al. | |
| 5,449,201 A | 9/1995 | Miller et al. | |
| 5,467,403 A | 11/1995 | Fishbine et al. | |
| 5,467,411 A | 11/1995 | Tanaka et al. | |
| 5,471,533 A | 11/1995 | Wang et al. | |
| 5,489,158 A | 2/1996 | Wang et al. | |
| 5,489,769 A | 2/1996 | Kubo | |
| 5,496,992 A | 3/1996 | Madan et al. | |
| 5,504,322 A | 4/1996 | Pavlidis et al. | |
| 5,504,367 A | 4/1996 | Arackellian et al. | |
| 5,506,697 A | 4/1996 | Li et al. | |
| 5,508,818 A | 4/1996 | Hamma | |
| 5,513,017 A | 4/1996 | Knodt et al. | |
| 5,513,264 A | 4/1996 | Wang et al. | |
| 5,521,366 A | 5/1996 | Wang et al. | |
| 5,550,336 A | 8/1996 | Kieffer | |
| 5,550,364 A | 8/1996 | Rudeen | |
| 5,557,091 A | 9/1996 | Krummel | |
| 5,557,095 A | 9/1996 | Clark et al. | |
| 5,557,519 A | 9/1996 | Morita | |
| 5,570,135 A | 10/1996 | Gove et al. | |
| 5,574,519 A | 11/1996 | Manico et al. | |
| 5,581,636 A | 12/1996 | Skinger | |
| 5,591,955 A | 1/1997 | Laser | |
| 5,591,956 A | 1/1997 | Longacre, Jr. et al. | |
| 5,598,007 A | 1/1997 | Bunce et al. | |
| 5,602,382 A | 2/1997 | Ulvr et al. | |
| 5,607,187 A | 3/1997 | Salive et al. | |
| 5,617,481 A | 4/1997 | Nakamura | |
| 5,627,915 A | 5/1997 | Rosser et al. | |
| 5,635,694 A | 6/1997 | Tuhro | |
| 5,635,697 A | 6/1997 | Shellhammer et al. | |
| 5,642,442 A | 6/1997 | Morton et al. | |
| 5,644,408 A | 7/1997 | Li et al. | |
| 5,646,390 A | 7/1997 | Wang et al. | |
| 5,654,533 A | 8/1997 | Suzuki et al. | |
| 5,659,167 A | 8/1997 | Wang et al. | |
| 5,668,803 A | 9/1997 | Tymes et al. | |
| 5,684,290 A | 11/1997 | Arackellian et al. | |
| 5,691,527 A | 11/1997 | Hara et al. | |
| 5,697,504 A | 12/1997 | Hiramatsu et al. | |
| 5,702,059 A | 12/1997 | Chu et al. | |
| 5,703,349 A | 12/1997 | Meyerson et al. | |
| 5,708,515 A | 1/1998 | Nishiura et al. | |
| 5,710,419 A | 1/1998 | Wang et al. | |
| 5,714,745 A | 2/1998 | Ju et al. | |
| 5,723,868 A | 3/1998 | Hammond, Jr. et al. | |
| 5,726,981 A | 3/1998 | Ylitervo et al. | |
| 5,734,153 A | 3/1998 | Swartz et al. | |
| 5,756,981 A | 5/1998 | Roustaei et al. | |
| 5,760,382 A | 6/1998 | Li et al. | |
| 5,761,686 A | 6/1998 | Bloomberg | |
| 5,763,866 A | 6/1998 | Seo et al. | |
| 5,770,841 A | 6/1998 | Moed et al. | |
| 5,773,806 A | 6/1998 | Longacre, Jr. | |
| 5,773,810 A | 6/1998 | Hussey et al. | |
| 5,780,834 A | 7/1998 | Havens et al. | |
| 5,783,811 A | 7/1998 | Feng et al. | |
| 5,786,586 A | 7/1998 | Pidhirny et al. | |
| 5,793,033 A | 8/1998 | Feng et al. | |
| 5,796,090 A | 8/1998 | Pavlidis et al. | |
| 5,801,371 A | 9/1998 | Kahn et al. | |
| 5,804,805 A | 9/1998 | Koenck et al. | |
| 5,811,784 A | 9/1998 | Tausch et al. | |
| 5,815,200 A | 9/1998 | Ju et al. | |
| 5,818,028 A | 10/1998 | Meyerson et al. | |
| 5,818,528 A | 10/1998 | Roth et al. | |
| 5,821,518 A | 10/1998 | Sussmeier et al. | |
| 5,821,523 A | 10/1998 | Bunte et al. | |
| 5,825,002 A | 10/1998 | Rosiak | |
| 5,834,754 A | 11/1998 | Feng et al. | |
| 5,837,986 A | 11/1998 | Barile et al. | |
| 5,841,121 A | 11/1998 | Koenck | |
| 5,844,227 A | 12/1998 | Schmidt et al. | |
| 5,857,029 A | 1/1999 | Patel | |
| 5,859,828 A | 1/1999 | Ishibashi et al. | |
| 5,867,595 A | 2/1999 | Cymbalski | |
| 5,869,828 A | 2/1999 | Braginsky | |
| 5,877,487 A | 3/1999 | Tani et al. | |

| | | | | | | |
|---|---|---|---|---|---|---|
| 5,880,453 A | 3/1999 | Wang et al. | 6,384,907 B1 | 5/2002 | Gooch et al. | |
| 5,886,338 A | 3/1999 | Arackellian et al. | 6,398,112 B1 | 6/2002 | Li et al. | |
| 5,892,824 A | 4/1999 | Beatson et al. | 6,405,929 B1 | 6/2002 | Ehrhart et al. | |
| 5,914,476 A | 6/1999 | Gerst, III et al. | 6,418,325 B1 | 7/2002 | Reber et al. | |
| 5,917,925 A | 6/1999 | Moore | 6,419,157 B1 | 7/2002 | Ehrhart et al. | |
| 5,917,945 A | 6/1999 | Cymbalski | 6,460,766 B1 | 10/2002 | Olschafskie et al. | |
| 5,920,056 A | 7/1999 | Bonnet | 6,494,375 B1 | 12/2002 | Ishibashi et al. | |
| 5,929,418 A | 7/1999 | Ehrhart et al. | 6,512,218 B1 | 1/2003 | Canini et al. | |
| 5,936,609 A | 8/1999 | Matsuoka et al. | 6,512,541 B2 | 1/2003 | Dunton et al. | |
| 5,942,743 A | 8/1999 | Schmidt et al. | 6,533,168 B1 | 3/2003 | Ching | |
| 5,945,661 A | 8/1999 | Nukui et al. | 6,539,360 B1 | 3/2003 | Kadaba | |
| 5,949,052 A | 9/1999 | Longacre, Jr. et al. | 6,556,242 B1 | 4/2003 | Dunton et al. | |
| 5,949,053 A | 9/1999 | Zlotnick | 6,561,428 B2 | 5/2003 | Meier et al. | |
| 5,949,057 A | 9/1999 | Feng | 6,572,020 B2 | 6/2003 | Barkan | |
| 5,965,863 A | 10/1999 | Parker et al. | 6,575,367 B1 | 6/2003 | Longacre, Jr. | |
| 5,974,202 A | 10/1999 | Wang et al. | 6,598,798 B1 | 7/2003 | Kashi et al. | |
| 5,990,744 A | 11/1999 | Nagaraj | 6,621,598 B1 | 9/2003 | Oda | |
| 5,992,744 A | 11/1999 | Smith et al. | 6,629,104 B1 | 9/2003 | Parulski et al. | |
| 5,992,753 A | 11/1999 | Xu | 6,629,642 B1 | 10/2003 | Swartz et al. | |
| 6,000,612 A | 12/1999 | Xu | 6,637,658 B2 | 10/2003 | Barber et al. | |
| 6,002,491 A | 12/1999 | Li et al. | 6,641,046 B2 | 11/2003 | Durbin | |
| 6,010,073 A | 1/2000 | Bianchi | 6,651,060 B1 | 11/2003 | Harper et al. | |
| 6,011,873 A | 1/2000 | Desai et al. | 6,655,597 B1 | 12/2003 | Swartz et al. | |
| 6,015,088 A | 1/2000 | Parker et al. | 6,678,425 B1 | 1/2004 | Flores et al. | |
| 6,019,286 A | 2/2000 | Li et al. | 6,681,994 B1 | 1/2004 | Koenck | |
| 6,024,284 A | 2/2000 | Schmid et al. | 6,688,523 B1 | 2/2004 | Koenck | |
| 6,036,095 A | 3/2000 | Seo | 6,694,366 B1 | 2/2004 | Gernert et al. | |
| 6,055,552 A | 4/2000 | Curry | 6,695,209 B1 | 2/2004 | La | |
| 6,060,722 A | 5/2000 | Havens et al. | 6,703,633 B2 | 3/2004 | Tullis | |
| 6,062,475 A | 5/2000 | Feng | 6,722,569 B2 * | 4/2004 | Ehrhart et al. | 235/469 |
| 6,070,805 A | 6/2000 | Kaufman et al. | 6,736,322 B2 | 5/2004 | Gobburu et al. | |
| 6,075,240 A | 6/2000 | Watanabe et al. | 6,738,092 B1 | 5/2004 | Nakagawa et al. | |
| 6,076,731 A | 6/2000 | Terrell | 6,746,164 B1 | 6/2004 | Albright et al. | |
| 6,076,733 A | 6/2000 | Wilz, Sr. et al. | 6,752,319 B1 | 6/2004 | Ehrhart et al. | |
| 6,076,738 A | 6/2000 | Bloomberg et al. | 6,758,403 B1 | 7/2004 | Keys et al. | |
| 6,081,827 A | 6/2000 | Reber et al. | 6,760,128 B2 | 7/2004 | Jackson et al. | |
| 6,089,455 A | 7/2000 | Yagita et al. | 6,766,053 B2 | 7/2004 | Fan et al. | |
| 6,094,509 A | 7/2000 | Zheng et al. | 6,772,949 B2 | 8/2004 | Wilz, Sr. et al. | |
| 6,095,418 A | 8/2000 | Swartz et al. | 6,783,069 B1 | 8/2004 | Hecht et al. | |
| 6,098,887 A | 8/2000 | Figarella et al. | 6,786,069 B2 | 9/2004 | Ochi et al. | |
| 6,101,487 A | 8/2000 | Yeung | 6,811,088 B2 | 11/2004 | Lanzaro et al. | |
| 6,102,295 A | 8/2000 | Ogami | 6,827,273 B2 | 12/2004 | Wilz, Sr. et al. | |
| 6,105,871 A | 8/2000 | Campo et al. | 6,831,682 B1 | 12/2004 | Silverbrook et al. | |
| 6,108,612 A | 8/2000 | Vescovi et al. | 6,832,725 B2 | 12/2004 | Gardiner et al. | |
| 6,115,513 A | 9/2000 | Miyazaki et al. | 6,834,807 B2 | 12/2004 | Ehrhart et al. | |
| 6,122,410 A | 9/2000 | Zheng et al. | 6,877,664 B1 | 4/2005 | Oliva | |
| 6,123,261 A | 9/2000 | Roustaei | 6,889,904 B2 | 5/2005 | Bianculli et al. | |
| 6,129,278 A | 10/2000 | Wang et al. | 6,910,633 B2 | 6/2005 | Swartz et al. | |
| 6,133,951 A | 10/2000 | Miyadera et al. | 6,915,955 B2 | 7/2005 | Jung et al. | |
| 6,149,063 A | 11/2000 | Reynolds et al. | 6,942,151 B2 | 9/2005 | Ehrhart | |
| 6,155,491 A | 12/2000 | Dueker et al. | 6,976,626 B2 | 12/2005 | Schmidt et al. | |
| 6,157,027 A | 12/2000 | Watanabe et al. | 6,976,631 B2 | 12/2005 | Kashi et al. | |
| 6,176,429 B1 | 1/2001 | Reddersen et al. | 7,068,821 B2 | 6/2006 | Matsutani et al. | |
| 6,186,404 B1 | 2/2001 | Ehrhart et al. | 7,111,787 B2 | 9/2006 | Ehrhart | |
| 6,189,796 B1 | 2/2001 | Itoh et al. | 7,121,468 B2 | 10/2006 | Schmidt et al. | |
| 6,195,122 B1 | 2/2001 | Vincent | 7,222,789 B2 | 5/2007 | Longacre, Jr. et al. | |
| 6,212,504 B1 | 4/2001 | Hayosh | 7,287,697 B2 * | 10/2007 | Ehrhart et al. | 235/462.02 |
| 6,220,509 B1 | 4/2001 | Byford | 7,293,712 B2 | 11/2007 | Wang | |
| 6,223,988 B1 | 5/2001 | Batterman et al. | 7,303,134 B2 | 12/2007 | Ehrhart et al. | |
| 6,234,394 B1 | 5/2001 | Kahn et al. | 7,413,127 B2 * | 8/2008 | Ehrhart et al. | 235/462.2 |
| 6,262,804 B1 | 7/2001 | Friend et al. | 7,686,222 B2 * | 3/2010 | Ehrhart et al. | 235/462.2 |
| 6,283,375 B1 | 9/2001 | Wilz, Sr. et al. | 2001/0055422 A1 | 12/2001 | Roustaei | |
| 6,285,916 B1 | 9/2001 | Kadaba et al. | 2002/0039099 A1 | 4/2002 | Harper | |
| 6,286,760 B1 | 9/2001 | Schmidt et al. | 2002/0053597 A1 | 5/2002 | Ehrhart et al. | |
| 6,290,132 B1 | 9/2001 | Dickson et al. | 2002/0084327 A1 | 7/2002 | Ehrhart et al. | |
| 6,292,181 B1 | 9/2001 | Banerjee et al. | 2002/0110283 A1 | 8/2002 | Fan et al. | |
| 6,298,176 B2 | 10/2001 | Longacre, Jr. et al. | 2002/0128796 A1 | 9/2002 | Matsutani | |
| 6,304,313 B1 | 10/2001 | Honma et al. | 2002/0170970 A1 | 11/2002 | Ehrhart | |
| 6,304,660 B1 | 10/2001 | Ehrhart et al. | 2002/0171745 A1 | 11/2002 | Ehrhart | |
| 6,311,896 B1 | 11/2001 | Mulla et al. | 2003/0034463 A1 | 2/2003 | Tullis | |
| 6,315,204 B1 | 11/2001 | Knighton et al. | 2003/0046192 A1 | 3/2003 | Eguchi et al. | |
| 6,321,992 B1 | 11/2001 | Knowles et al. | 2003/0062413 A1 | 4/2003 | Gardiner et al. | |
| 6,330,975 B1 | 12/2001 | Bunte et al. | 2003/0089775 A1 | 5/2003 | Yeakley et al. | |
| 6,336,587 B1 | 1/2002 | He et al. | 2003/0127519 A1 | 7/2003 | Ehrhart et al. | |
| 6,340,114 B1 | 1/2002 | Correa et al. | 2003/0206150 A1 | 11/2003 | Hussey et al. | |
| 6,347,163 B2 | 2/2002 | Roustaei | 2004/0059806 A1 | 3/2004 | Webb | |
| 6,357,662 B1 | 3/2002 | Helton et al. | 2004/0155110 A1 | 8/2004 | Ehrhart et al. | |
| 6,373,507 B1 | 4/2002 | Camara et al. | 2004/0182928 A1 | 9/2004 | Ehrhart et al. | |
| 6,375,075 B1 | 4/2002 | Ackley et al. | 2004/0206825 A1 | 10/2004 | Schmidt et al. | |

| | | | |
|---|---|---|---|
| 2005/0001035 | A1 | 1/2005 | Hawley et al. |
| 2005/0056699 | A1 | 3/2005 | Meier et al. |
| 2005/0161511 | A1 | 7/2005 | Parker et al. |
| 2005/0167504 | A1 | 8/2005 | Meier et al. |
| 2005/0167507 | A1 | 8/2005 | Swartz et al. |
| 2005/0184159 | A1 | 8/2005 | Hattori et al. |
| 2006/0023218 | A1 | 2/2006 | Jung et al. |
| 2006/0274171 | A1 | 12/2006 | Wang |

FOREIGN PATENT DOCUMENTS

| | | |
|---|---|---|
| EP | 0392159 A2 | 10/1990 |
| EP | 0439682 A2 | 8/1991 |
| EP | 0498366 A2 | 8/1992 |
| EP | 0690403 A2 | 1/1996 |
| EP | 0733991 A2 | 9/1996 |
| EP | 0910032 A2 | 4/1999 |
| EP | 0917087 A1 | 5/1999 |
| EP | 0978990 A2 | 2/2000 |
| EP | 998147 A1 | 5/2000 |
| EP | 999514 A1 | 5/2000 |
| EP | 1050793 A2 | 11/2000 |
| GB | 2357209 A | 6/2001 |
| JP | 61059569 A | 3/1986 |
| JP | 63311474 A | 12/1988 |
| JP | 1216486 A | 8/1989 |
| JP | 3020058 A | 1/1991 |
| JP | 3054680 A | 3/1991 |
| JP | 4257844 A | 9/1992 |
| JP | 04316178 A | 11/1992 |
| JP | 5324900 A | 12/1993 |
| JP | 6250775 A | 9/1994 |
| JP | 9204487 A | 8/1997 |
| JP | 9259215 A | 10/1997 |
| JP | 10224773 A | 8/1998 |
| JP | 11-220639 A | 8/1999 |
| JP | 11232378 A | 8/1999 |
| JP | 2000050028 A | 2/2000 |
| JP | 2000-82107 A | 3/2000 |
| JP | 2000293622 A | 10/2000 |
| JP | 2002111909 A | 4/2002 |
| WO | 9202371 A1 | 2/1992 |
| WO | 9217861 A1 | 10/1992 |
| WO | 9513196 A1 | 5/1995 |
| WO | 9524278 A1 | 9/1995 |
| WO | 9534043 A1 | 12/1995 |
| WO | 9639676 A1 | 12/1996 |
| WO | 9708647 A1 | 3/1997 |
| WO | 9950736 A1 | 10/1999 |
| WO | 0016241 A1 | 3/2000 |
| WO | 0072246 A1 | 11/2000 |
| WO | 0122358 A1 | 3/2001 |
| WO | 0146899 A2 | 6/2001 |
| WO | 02080520 A2 | 10/2002 |
| WO | 03001435 A1 | 1/2003 |
| WO | 03008152 A1 | 10/2003 |
| WO | 03081521 A1 | 10/2003 |
| WO | 2004064382 A1 | 7/2004 |

OTHER PUBLICATIONS

Japanese Patent Office, Japanese Patent Application No. 2004-521398, Notice of Grounds for Rejection with English Translation, dated Mar. 1, 2011 (18 pages).
Amendment filed Feb. 2, 2005, for U.S. Appl. No. 10/143,158, 11 pages.
Amendment filed Jun. 28, 2004, for U.S. Appl. No. 10/143,158, 14 pages.
Amendment in Response to Non-Final Office Action for U.S. Appl. No. 11/903,747 dated Dec. 16, 2009.
Anonymous, Manufacturing Systems, Jan. 1995, 13, 1; ABI/INFORM Complete, Hand Held Image Scanner a First, (1 page).
Anonymous, OEP, Tokyo, Sep. 1987, vol. 16, Issue 107, p. 54, ProQuest Document View—Barcode Reader (1 page).
Berge, Paul, George Washington University SFX, Data Processing, Guildford; Nov. 1984, vol. 26, Issue 9, p. 28, ProQuest Document Viewer—Using Bar Code Systems for Product Identification, (1 page).
Dilling, Richard, George Washington University SFX, Systems International, London, Apr. 1984, vol. 12, Issue 4, p. 57, ProQuest Document View—Bar Codes: Designing in (1 page).
Edge, Work-Group Computing Report, Nov. 23, 1008, Article— Handheld Computing: NEC Computer Systems Division Announces Newest MobilePro Handheld Personal Computer—the Mobile Pro 800-Product Announcement (4 pages).
European Patent Application No. 02752328.1, Second Office Action dated Mar. 22, 2010 (7 pages).
Examiner-Initiated Interview Summary, U.S. Appl. No. 09/858,163, U.S. Publication No. 2002-0171745 A1, Dec. 22, 2005, 2 pages.
Forger, Gary, Modern Materials Handling, Boston, Sep. 1989, vol. 44, Issue 9, p. 51, Modern Materials Handling Document Summary—A Course-in-Print Bar Code Systems Basics (1 page).
Gonzalez; Woods, "Digital Image Processing," Library of Congress, 10 page article, pp. 416-425 and pp. 452-457; Copyright 1992 by Addision Wesley Publishing Company, Inc.
Information Summary for Reexamination Control No. 90/008,606, Summary including: Request for ExParte Reexamination for U.S. Patent No. 6,722,569 dated Apr. 20, 2007; Order Granting Reexamination Request dated Aug. 22, 2008; Summary dated Jun. 11, 2008.
Information Summary for Reexamination Control No. 90/008,812, Summary Including: Request for ExParte Reexamination for U.S. Patent No. 6,834,807 dated Aug. 21, 2007; Response to Notice of Failure to Comply dated Oct. 24, 2007; Order Granting Reexamination Request dated Jan. 8, 2008; Summary dated Jun. 11, 2008.
International Search Report for International Patent Application No. PCT/US02/15095 dated Feb. 12, 2002.
International Search Report for International Patent Application No. PCT/US02/15095 dated Nov. 20, 2002.
Japanese Interrogation issued for JP Application No. 2004-521398 dated Nov. 10, 2009.
Japanese Office Action for Japanese Patent Application No. 2004-521398, dated Feb. 5, 2008, 2 pages (accompanied by full text English translation thereof, 3 pages).
Langer, G., Siemens AG, Muchen, West Germany, Data Report, vol. 18, No. 4, Aug. 1983, p. 32-33, West Germany, Hand-Held Scanner for OCR and Bar Code Abstract (1 page).
Martin Adickes; Richard E. Billo, Journal of Manufacturing Systems, 1998, 17, 5, ABI/INFORM Complete, Test Protocol for Comparing Two-Dimensional Bar Code Hand-Held Reader Technologies, pp. 361-370.
McDonald, Richard A., George Washington University SFX, Industrial Engineering, Norcross, Nov. 1985, vol. 17, Issue 11, p. 70, ProQuest Document View—Bar Code Systems Enhance Productivity of Computer Systems with Real-Time Mode, (1 page).
Michele Pepe, Computer Reseller News, Nov. 15, 1999, 869, ABI/INFORM Complete, Two-Dimensional Bar Codes Begin to Make Mark, p. 281.
Miyazaki, H., Shirakabe, K., Otsuki, Y., Ono, Y., Sugama, S., Ishii, K., Autom. Div., NEC Corp., Tokyo, Japan, NEC Research & Development, vol. 34, No. 2, Apr. 1993, pp. 239-247, Japan, Autofocussing Type Barcode Reader OBR-70-7Af with Advanced BeamForming and Decoding Techniques—Omnidirectional Reading in Great Depth of Field Abstract (1 page).
Notice of Allowance and Fees Due, U.S. Appl. No. 09/858,163, U.S. Publication No. 2002-0171745 A1, Jan. 3, 2006, 3 pages.
Notice of Assignment of Reexamination Request, U.S. Patent No. 6,722,569, Reexamination Control No. 90/008,606, dated Jun. 11, 2007, 1 page.
Notice of Reexamination Request Filing Date, U.S. Patent No. 6,722,569, Control No. 90/008,606, Jun. 11, 2007 (1 page).
Notice of Termination of Preprocessing of ExParte Reexamination Request (37 C.F.R. 1.510(c)), U.S. Patent No. 6,834,807, dated May 11, 2007, 2 pages.
Okamura, H., Nakamura, T., Fujiwaki, K., Besshi, S., Kimura, Y., Tahara, S., Takayama, T., Sumitomo Electric Ind. Ltd., Osaka, Japan, Sumitomo Electric Technical Review, No. 30, Jun. 1990, pp. 125-129, Japan, Developement of Hand-Held Computer Terminal with Bar Code Scanner Abstract (1 page).
Panchak, Patricia L., Modern Office Technology, v36, n6, p. 44(3), Jun. 1991 Article—Scanners Revolutionize Data/Image Input (6 pages).

Poletti, Therese, Crain's New York Business, New York, Aug. 29, 1988, vol. 4, Issue 35, Selection 1, p. 5, ProQuest Document View—Bar Codes Make Symbol's Coffers Sing (3 pages).

Rakowski, Leo, Modern Machine Shop, Feb. 2001, Article—Getting a Read on 3D Bar Codes, (2 pages).

Rowell, Dave, PC Sources, v3, N1, P200(12), Jan. 1992, Article—Easy Entry; Shopping for an Optical Scanner (20 pages).

Snell, Ned, Datamation, Barrington, Apr. 1, 1992, vol. 28, Issue 7, p. 71, ProQuest Document View—Bar Codes Break Out (2 pages).

Spencer, Harvey, Today, Oct. 1999, Article—Using Color for Forms Processing (2 pages).

Sven, H.M., Wang, J.F., Text String Extraction from Images of Colour-Printed Documents—IEEE Proc.-Vis. Image Signal Process, vol. 143, No. 4, Aug. 1996, pp. 210-216.

Tanaka, Yasuya, Satoh, Yoji, Kashi, Motofumi, Fujitsu Scientific and Technical Journal, vol. 35, n2, 1999, pp. 267-273, Fujitsu Ltd., Hand-Held Terminal with Multi-Code Reader Abstract (1 page).

U.S. Appl. No. 11/592,636, filed Nov. 3, 2006, Michael Ehrhart et al., claim set (3 pages).

USPTO Notice of Assignment of Reexamination Request, U.S. Patent No. 6,722,569, Control No. 90/008,606, Jun. 11, 2007, (1 page).

USPTO Notice of Reexamination Request Filing Date, U.S. Patent No. 6,722,569, Control No. 90/008,606, Jun. 11, 2007, (1 page).

USPTO PTOL-2079 Notice of Termination of Preprocessing of ExParte Reexamination Request (37 CFR 1.510(c)), May 11, 2007, (2 pages).

Zhang, Xuesong, Bejing University of Science and Technology, Optical Technique, n2, Mar. 20, 1994, pp. 5-10, 29, Engineering Village 2 Abstract—Design of Portable Bar Code Reader (1 page).

European Patent Office, Summons to attend oral proceedings pursuant to Rule 115(1) EPC, European Patent Application No. 02752328.1, dated Sep. 3, 2010, (3 pages).

Ehrhart et al., ExParte Reexamination Certificate, U.S. Patent No. 6,834,807, dated Jul. 27, 2010, (6 pages).

Ehrhart et al., ExParte Reexamination Certificate, U.S. Patent No. 6,722,569, dated Jul. 13, 2010, (6 pages).

Oct. 8, 2012 Office Action in U.S. Appl. No. 12/748,076.

Feb. 2, 2012 Decision to Refuse a European Patent Application in European Application No. 02752328.1.

Feb. 2, 2012 Provision of the Minutes in Accordance with Rule 124(4) EPC in European Application No. 02752328.1.

European Communication and partial Search Report dated Jul. 27, 2012 in European Application No. 10012905.5 of Hand Held Products, Inc.

Response to Appeal dated Jun. 12, 2012 in European Patent Application No. 02752328.1 of Hand Held Products, Inc.

Feb. 7, 2012 Office Action in Japanese Application No. 2010-253247, with machine translation.

Oct. 8, 2011 Office Action in U.S. Appl. No. 12/748,076.

Mar. 22, 2011 Notice of Allowance in U.S. Appl. No. 12/748,076.

Oct. 11, 2011 Notice of Allowance in U.S. Appl. No. 12/748,076.

Apr. 16, 2012 Office Action in U.S. Appl. No. 12/748,076.

* cited by examiner

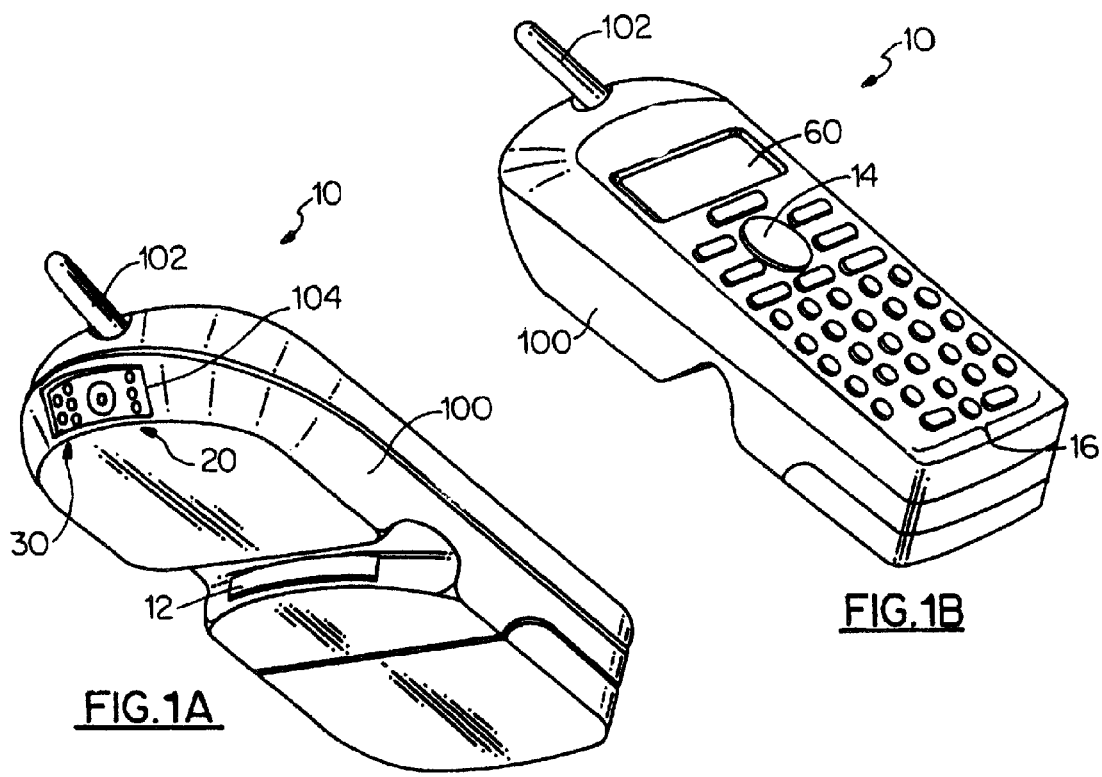
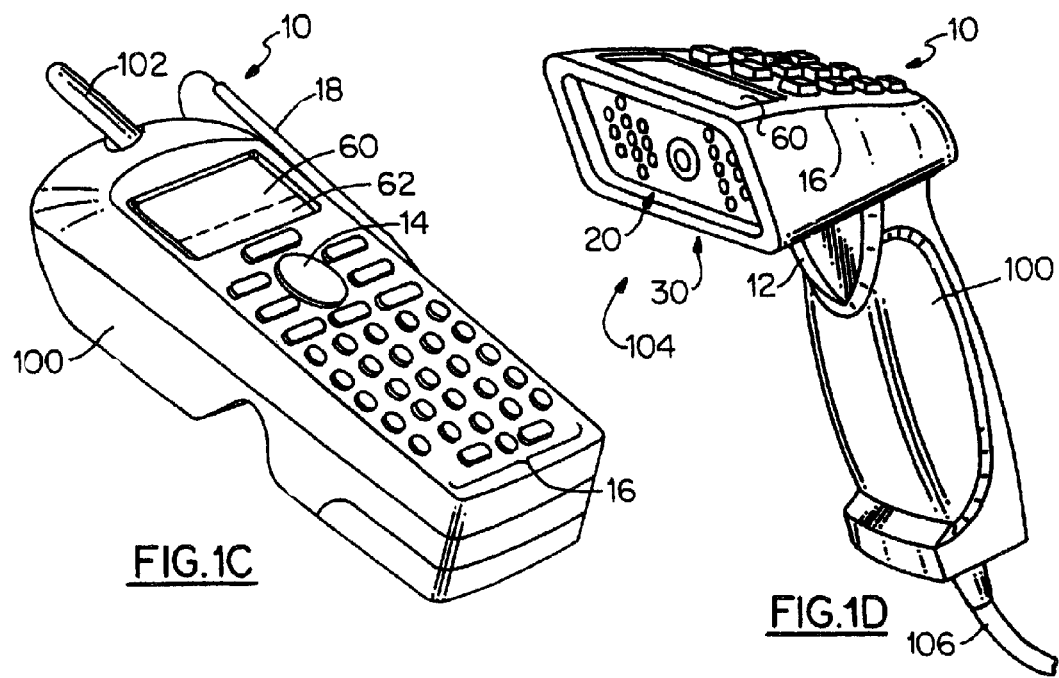

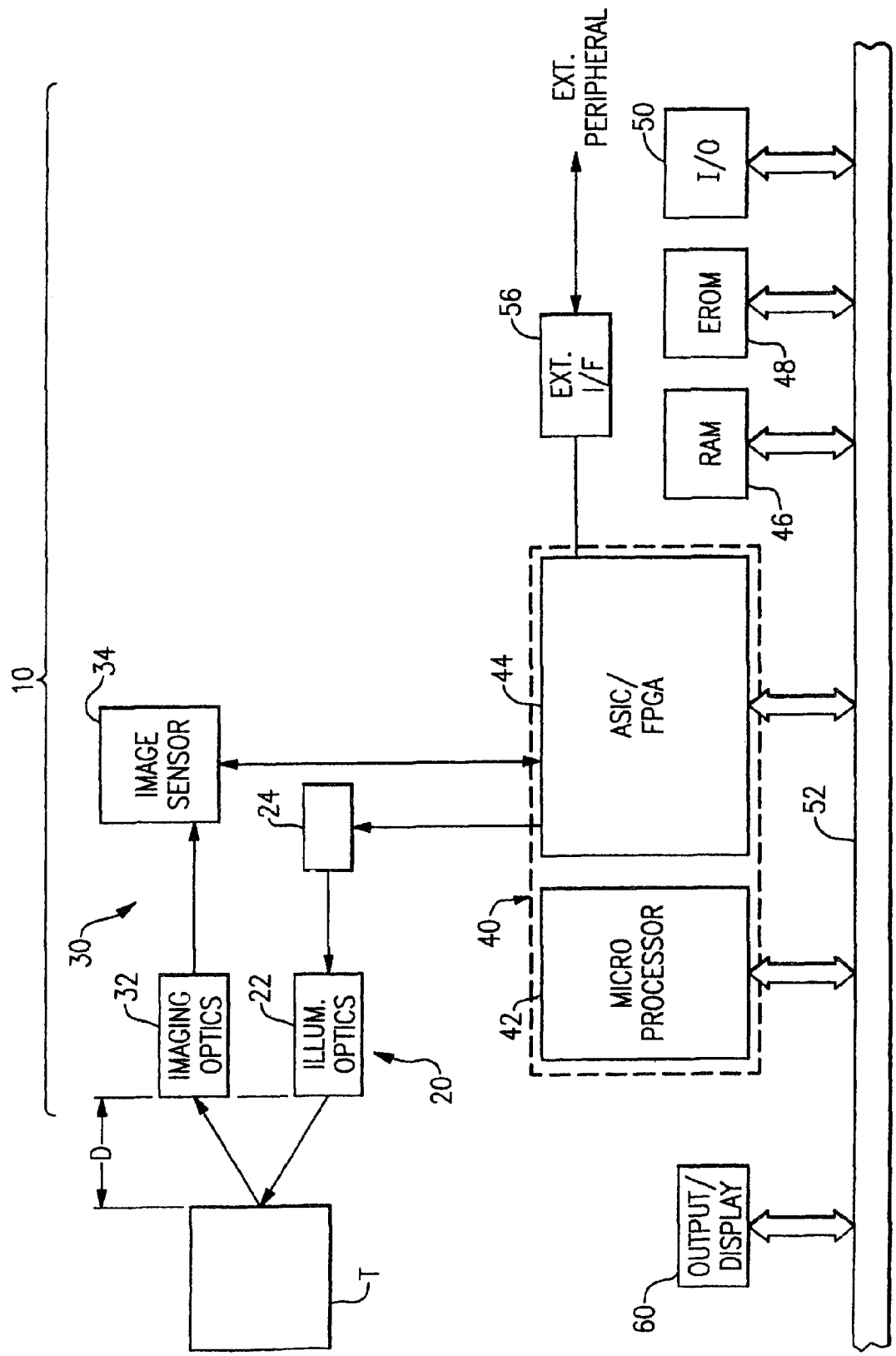

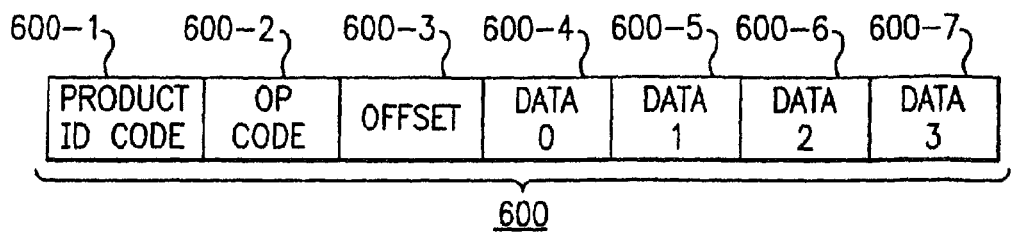

FIG.6A

OPTIONS (OFFSET) TABLE
A. COMMUNICATIONS OPTIONS
   1. RS-232
   2. BAUD RATE
   3. RF LINK
   4. ETHERNET

B. CODE OPTIONS
   1. DISABLE 1D
   2. DISABLE 2D
   3. DISABLE INDIV.
   4. MIN-MAX LENGTH
   5. MULTIPLE SYMBOLS ENABLED

C. SCANNING-DECODING OPTIONS
   1. ONE SHOT
   2. REPEAT UNTIL DONE
   3. REPEAT UNTIL STOPPED
   4. SCAN ON DEMAND
   5. SKIP SCAN
   6. DECODE ON DEMAND

D. OPERATING OPTIONS
   1. BEEPER VOLUME
   2. AIMING LED ON/OFF
   3. AURAL FEEDBACK

E. TRANSMIT OPTIONS
   1. SEND CHECK CHAR'S
   2. SEND CHECKSUM
   3. DATA EDIT OPTIONS

F. READER MODE OPTIONS
   1. AUTOMATIC
   2. SEMI-AUTOMATIC
   3. BAR CODE SCANNING
   4. OCR
   5. SIGNATURE
   6. COLOR IMAGING

FIG.6B

OP CODE TABLE
A. OP CODE "0"-VECTOR PROC.
   1. OUTPUT VERSION OF SOFTWARE
   2. OUTPUT CONTENTS OF PARAMETER TABLE
   3. DISPLAY ENABLED CODES
   4. PRINT PARAMETER TABLE AS BAR CODE SYMBOL

B. OP CODE "1" - CLEAR
C. OP CODE "2" - SET
D. OP CODE "3" - TOGGLE
E. OP CODE "4" - ADD
F. OP CODE "5" - DEFAULT
G. OP CODE "6" - LOAD
H. OP CODE "7" - RESERVED

FIG.6C

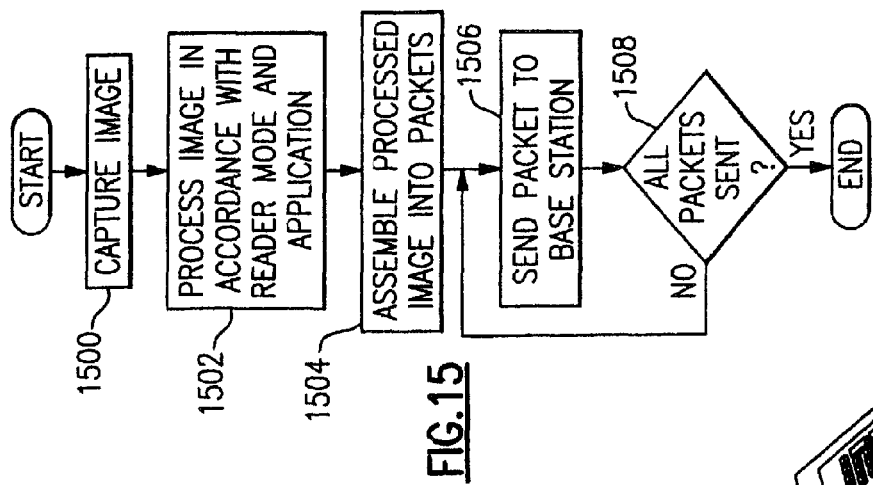
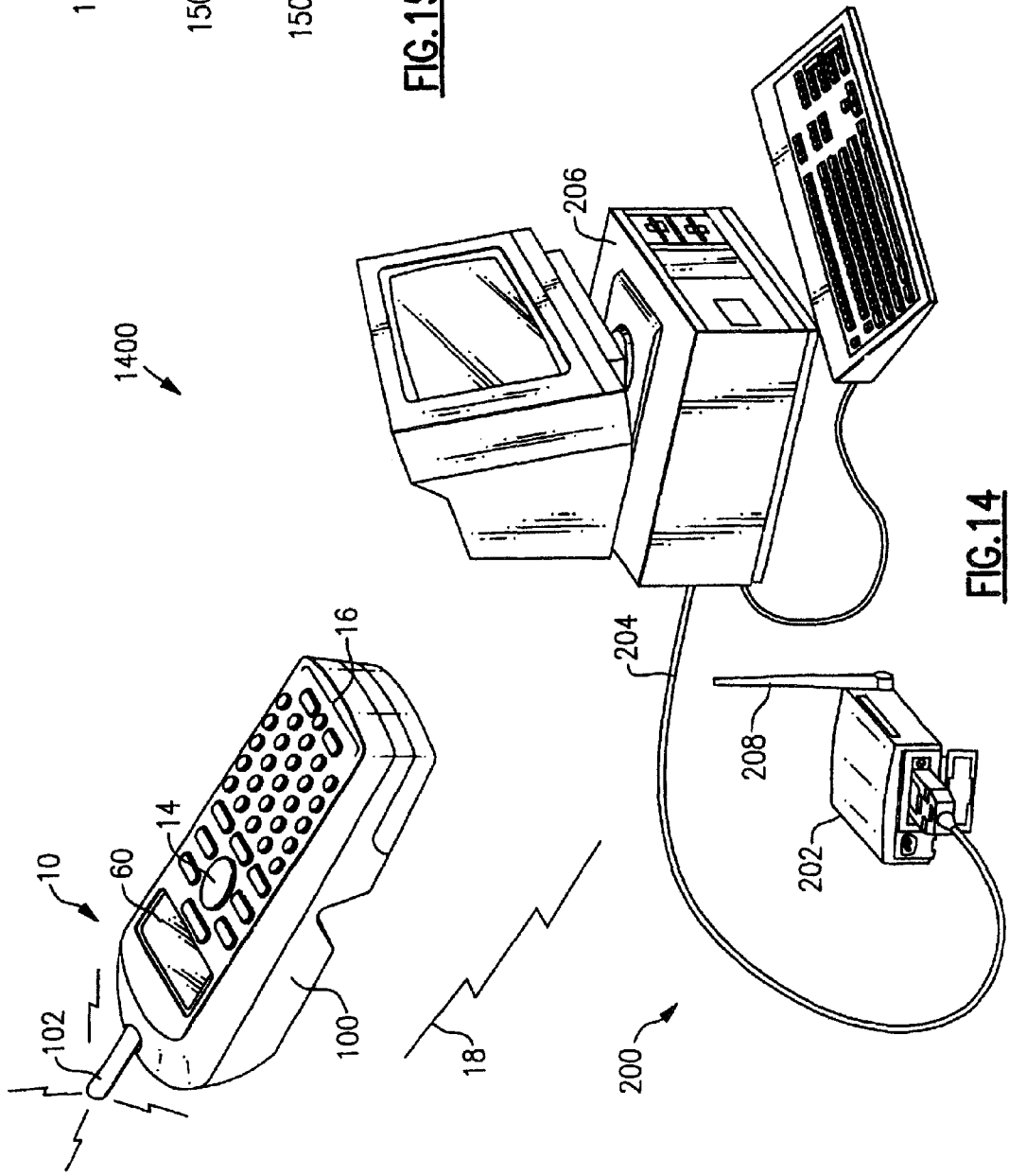

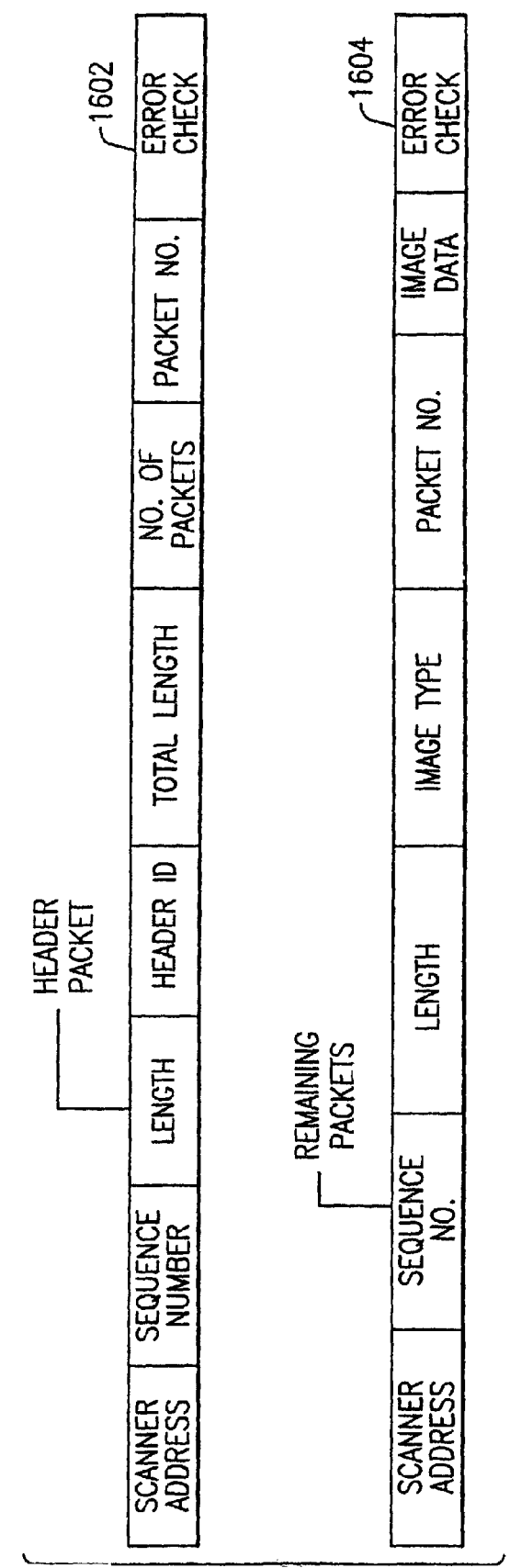

OPTICAL READER HAVING AN IMAGER

CROSS-REFERENCE TO RELATED APPLICATIONS

The present application is a divisional application of U.S. patent application Ser. No. 12/748,076 filed Mar. 26, 2010, which is a continuation U.S. patent application Ser. No. 12/188,804 filed Aug. 8, 2008 and issued as U.S. Pat. No. 7,686,222 on Mar. 30, 2010, which is a divisional application of U.S. patent application Ser. No. 11/592,636 filed Nov. 3, 2006 and issued as U.S. Pat. No. 7,413,127 on Aug. 19, 2008, which is a divisional of U.S. patent application Ser. No. 10/764,741 filed on Jan. 26, 2004 and issued as U.S. Pat. No. 7,287,697 on Oct. 30, 2007, which is a continuation of U.S. patent application Ser. No. 09/904,697 filed Jul. 13, 2001 and issued as U.S. Pat. No. 6,722,569 on Apr. 20, 2004. The benefit of priority under 35 U.S.C. §120 of each of the above applications is claimed and each of the above applications is incorporated herein by reference in its entirety.

BACKGROUND OF THE INVENTION

The present invention relates generally to optical readers, and particularly to optical readers employing imagers.

TECHNICAL FIELD

Optical indicia readers equipped to read one-dimensional or two-dimensional bar code symbols are well known in the art. There are a number of optical character recognition systems on the market as well. In addition, many financial institutions today employ computer-driven signature capture systems. Many of these systems employ monochrome imagers because monochrome imagers are well-suited to read graphical symbols, such as bar codes, OCR symbols, or signatures.

On the other hand, the ability to provide image capture functionality along with indicia reading in one device is very appealing. Currently, optical readers having image capture functionality use monochrome imagers that provide gray scale images. While such devices are useful, gray scale images are less desirable than color images for viewing purposes. The public has come to expect color imaging. Further, monochrome images are often less distinct and not as informative as color images.

Unfortunately, there are problems associated with using color imaging systems to read graphical symbols. The first problem relates to the difficulty of distinguishing bi-tonal indicia in a color image. Because color imagers provide more information that bi-tonal indicia readers can use, color imaging data is often confusing to graphical symbol indicia readers. One way to solve this problem is to convert the color imaging data into gray-scale data. However, commercially available methods for converting color images to gray-scale are too slow for high-volume scanning. Thus, an optical reader employing a color imager with a gray scale converter would be slower and more expensive than an optical reader using monochrome imager because of the additional processing required.

Thus, a need exists for an inexpensive optical reader that is capable of performing color photography and evaluating graphical symbols. This optical reader must be capable of automatically determining whether an image includes a graphical symbol or is merely a color photographic image, and process the acquired color imaging data based on that determination. A need also exists for an optical reader that is able to associate an acquired color image with any subsequent acquired color image.

SUMMARY OF THE INVENTION

There is described a device having a two dimensional imager. The device having a two dimensional image sensor can be a hand held device. Imaging optics can be provided for focusing light reflected from a target onto the two dimensional imager. An image including imaging data can be obtained utilizing the hand held device.

BRIEF DESCRIPTION OF THE INVENTION

FIGS. 1A-1D are perspective views of various embodiments of the optical reader of the present invention;

FIG. 2 is a block diagram of the electro-optical assembly of the optical reader of the present invention;

FIG. 14 is a perspective view of a wireless color optical reader in accordance with yet another embodiment of the present invention;

FIG. 15 is a flow chart showing a method for transmitting packetized data from a color optical reader to a base station;

FIGS. 16A and 16B are diagrammatic depictions of packet formats in accordance with yet another embodiment of the present invention;

DETAILED DESCRIPTION OF THE INVENTION

Figure 3:
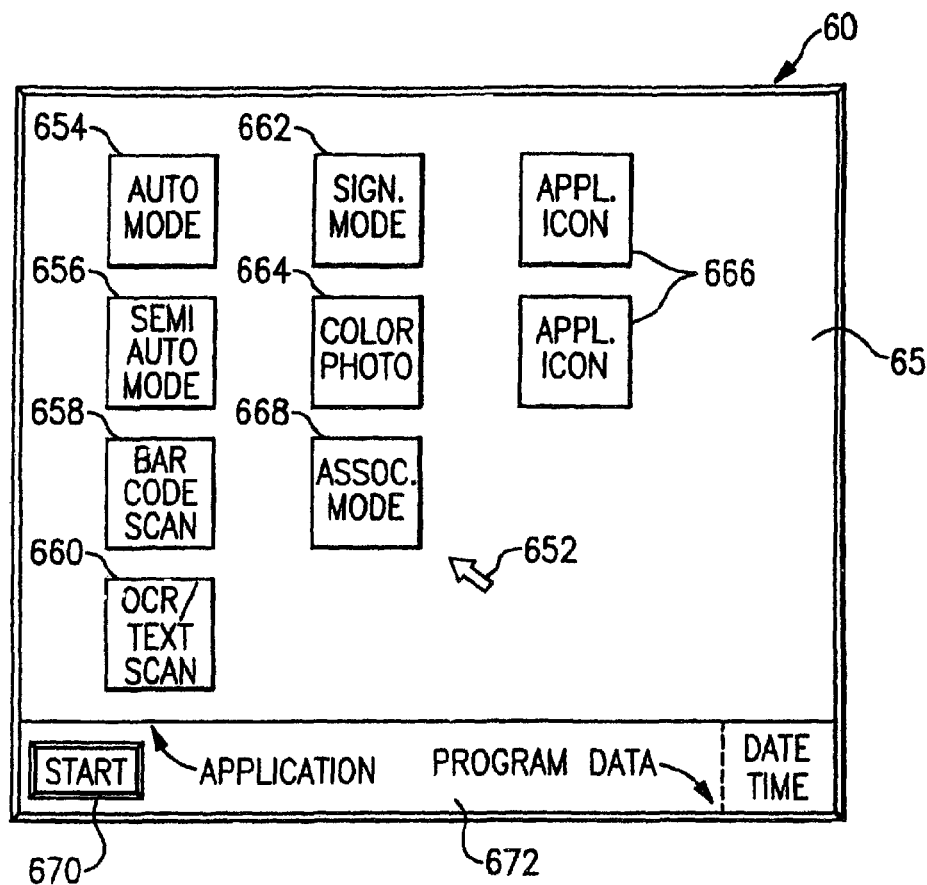
FIG. 3 is an example of a graphical user interface display in accordance with the present invention.

The present invention addresses the needs identified above. The present invention is directed to an inexpensive optical reader that is configured to perform color photography or evaluate graphical symbols. The optical reader of the present invention automatically, or through manual selection, determines whether a captured image is a color photographic image or, a color image that includes a graphical symbol. Subsequently, the optical reader of the present invention processes the acquired imaging data in accordance with that determination. The optical reader of the present invention is operative to acquire and associate a plurality of acquired images.

One aspect of the present invention is an optical reader. The optical reader includes a color imaging assembly for acquiring an image of an object, the color imaging assembly generating imaging data corresponding to the image. An image analysis circuit is coupled to the color imaging assembly. The image analysis circuit being configured to determine if the color imaging data includes at least one graphical symbol. The image is classified as a graphical symbol, or the image is classified as a color photograph if the color imaging data does not include at least one graphical symbol. A processing circuit is coupled to the image analysis circuit. The processing circuit is operative to process the imaging data based on the determination.

In another aspect, the present invention includes an optical reader for capturing an image of an object. The optical reader includes a color imaging assembly for converting the image of the object into color digital data corresponding to the image.

An automatic mode selection circuit is coupled to the color imaging assembly. The mode selection circuit uses at least a portion of the color digital data to select one of a plurality of operational modes of the optical reader. The operational modes include at least a graphical symbol mode and a color photography mode. A processing circuit is coupled to the mode selection circuit. The processing circuit is configured to process the color digital data based on the selected operational mode.

In another aspect, the present invention includes an optical reader for capturing an image of an object. The optical reader includes a color imaging assembly for capturing the image as color imaging data. A classification circuit is coupled to the color imaging assembly, the classification circuit being configured to process at least a portion of the color imaging data to thereby select one of a plurality of classifications, whereby the image is classified as a color photographic image, or as an image that includes at least one graphical symbol. An automatic mode selector is coupled to the classification circuit, the automatic mode selector being configured to select an optical reader mode in accordance with the selected classification. A processor is coupled to the classification circuit, the processor being programmed to process the color imaging data in accordance with the optical reader mode selected by the automatic mode selector.

In another aspect, the present invention includes an optical reader for capturing an image of an object. The optical reader includes a color imaging assembly for capturing the image as color imaging data. A user mode selector is coupled to the color imaging assembly, the user mode selector being switchable between at least one automatic user mode, or a manual user mode for manually selecting one of a plurality of imaging modes of the optical reader, whereby the plurality of imaging modes includes at least one graphical symbol mode and a color photography mode. An automatic imaging mode selector is coupled to the user mode selector and the color imaging assembly, the automatic imaging mode selector being operative to automatically select one of the plurality of imaging modes when in the automatic user mode. A processing circuit is coupled to the user mode selector and the automatic mode selector, the processing circuit being programmed to process the color imaging data based on the selected one of the plurality of operational modes.

In another aspect, the present invention includes a method for acquiring an image of an object with an optical reader. The method includes: acquiring first color imaging data representing the image; analyzing the color imaging data to provide an image classification, whereby the image is classified as a color photograph, or as including at least one graphical symbol; and processing the color imaging data in accordance with the image classification.

In another aspect, the present invention includes a computer readable medium having computer-executable instructions for performing a method including: acquiring color imaging data; analyzing the color imaging data to provide an image classification, whereby the image is classified as a color photograph, or the image is classified as including at least one graphical symbol; and processing the color imaging data in accordance with the image classification.

In another aspect, the present invention includes an optical reader having a color imaging assembly for acquiring color imaging data, and a graphical user interface including a display and a selection device. In the optical reader, a method for selecting at least one optical reader operating mode includes: displaying at least one icon on the graphical user interface, the at least one icon corresponding to the at least one optical reader operating mode; clicking on the at least one icon with the selection device to thereby select the at least one optical reader operating mode corresponding to the selected at least one icon; and processing the color imaging data based on the selected at least one icon, whereby the color imaging data is processed as a color photographic image, or as an image that includes at least one graphical symbol.

In another aspect, the present invention includes an optical reader having a color imaging assembly for acquiring color imaging data, and a graphical user interface including a display and a selection device. In the optical reader, a method of providing and selecting from a menu on the display includes: retrieving a set of menu entries for the menu, each of the menu entries representing at least one operational mode of the optical reader; displaying the set of menu entries on the display; selecting a menu entry; emitting a menu selection signal indicative of a selected operational mode; and processing the imaging data based on the selected menu entry, whereby the imaging data is processed as a color photographic image or as an image that includes at least one graphical symbol.

In another aspect, the present invention includes a method for acquiring an image of an object with an optical reader. The method includes: providing a color imaging assembly; converting the image into color imaging data; classifying the image as either a color photograph, or as a color image that includes at least one graphical symbol; and processing the color imaging data in accordance with the step of classifying.

In another aspect, the present invention includes a method for acquiring an image of an object with an optical reader. The optical reader has a plurality of imaging modes including at least one graphical symbol mode, and a color photography mode. The method includes: capturing the image by acquiring color imaging data; analyzing at least a portion of the color imaging data to provide an image classification, whereby the image classification includes at least one graphical symbol classification and a color photography classification; automatically selecting one of a plurality of image processing modes based on the image classification provided in the step of analyzing; and processing the color imaging data based on the selected one of the plurality of image processing modes.

In another aspect, the present invention includes a method for acquiring an image of an object with an optical reader. The optical reader has a plurality of imaging modes including at least one graphical symbol mode, and a color photography mode. The method includes: capturing the image by acquiring color imaging data; automatically selecting one of the plurality of imaging modes based on an analysis of the color imaging data; and processing the color imaging data in accordance with a selected one of the plurality of imaging modes.

In another aspect, the present invention includes a system for processing at least one image. The system includes at least one network element. The system includes an optical reader including a color imager and a processor. The color imager is configured to capture the at least one image by generating color imaging data corresponding to the at least one image. The processor is configured to provide a classification of the color imaging data based on whether the color imaging data includes at least one graphical symbol. The processor is programmed to process the color imaging data in accordance with the classification. A network is coupled to the color optical reader and the at least one network element, whereby processed image data is transmitted between the network and the at least one network element.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that the description herein is merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the optical reader of the present invention is shown in FIG. 1, and is designated generally throughout by reference numeral 10.

In accordance with the invention, the present invention for an optical reader includes a color imaging assembly for acquiring color imaging data. An image analysis circuit determines if the acquired image includes at least one graphical symbol. A processing circuit processes the imaging data based on the determination of whether the image includes at least one graphical symbol. The present invention allows a user to read graphical symbols, such as bar codes, text, OCR characters or signatures using a color imager. The color optical reader of the present invention is configured to automatically determine whether a color image includes a graphical symbol, or is merely a color photographic image. The optical reader of the present invention also is operative to associate one acquired image with at least one subsequently acquired image.

As embodied herein, and depicted in FIGS. 1A-1D, perspective views of the optical reader in accordance with various embodiments of the present invention are disclosed. FIG. 1A shows the underside of hand held wireless optical reader 10. FIG. 1B shows the top of the optical reader depicted in FIG. 1A. Optical reader 10 includes housing 100, antenna 102, window 104 and trigger 12. Window 104 accommodates illumination assembly 20 and imaging assembly 30. As shown in FIG. 1B, the top side of reader 10 includes function keys 14, alphanumeric key pad 16, and display 60. In one embodiment, function keys 14 include an enter key and up and down cursor keys. FIG. 1C is also a hand held wireless optical reader 10. Reader 10 includes function keys 14, alphanumeric key pad 16, writing stylus 18, display 60, and signature block 62. Stylus 18 is employed by a user to write his signature in signature block 62. FIG. 1D shows yet another embodiment of optical reader 10 of the present invention. In this embodiment, reader 10 includes a gun-shaped housing 100. Display 60 and keypad 16 are disposed on a top portion of gun-shaped housing 100, whereas trigger 12 is disposed on the underside of the top portion of housing 100. Housing 100 also includes window 104 that accommodates illumination assembly 20 and imaging assembly 30. Wire 106 is disposed at the butt-end of housing 100. Wire 106 provides optical reader 10 with a hard wired communication link for external devices such as a host processor or other data collection devices.

As embodied herein and depicted in FIG. 2, a block diagram of the electro-optical assembly of optical reader 10 of the present invention is disclosed. Optical reader 10 includes illumination assembly 20 and color imaging assembly 30, connected to processor 40. Illumination assembly 20 includes illumination optics 22 coupled to light source 24. Light source 24 is coupled to ASIC/FPGA 44. ASIC/FPGA 44 is programmed to drive light source 24. Imaging assembly 30 includes imaging optics 32 and color imager 34. Imaging optics 32 focuses the illumination light reflected from target T onto color imager 34. Color imager 34 provides color imaging data to ASIC/FPGA 44. Color imager 34 performs several functions. Color imager 34 generates analog color image signals using an imaging array color filter. The array color filter pattern is a Bayer-pattern. The analog color imaging data is converted into a digital format using an internal A/D converter which also functions as a quantizer. An 8-bit system provides 256 brightness levels, whereas a 12-bit converter provides over 4,000 brightness levels. Digital color imaging data is transmitted from imager 34 to ASIC/FPGA 44 and processor 42.

Optical reader 10 also includes processor 40. In the embodiment depicted in FIG. 2, processor 40 includes microprocessor 42 and ASIC 44. System bus 52 couples microprocessor 40, RAM 46, EROM 48, I/O circuit 50 and display 60.

Illumination optics 22 may be of any suitable type, but there is shown by way of example a lens system for directing light from light source 24 towards target T. It will be apparent to those of ordinary skill in the pertinent art that modifications and variations can be made to illumination optics 22 of the present invention depending on the complexity of the target illumination. For example, illumination optics 22 may include one or more lenses, diffusers, wedges, reflectors or a combination of these elements. In one embodiment, illumination optics 22 produces an aiming pattern on target T.

Light source 24 may be of any suitable type, but there is shown by way of example a plurality of white LEDs. It will be apparent to those of ordinary skill in the pertinent art that modifications and variations can be made to light source 24 of the present invention depending on the application. For example, illumination assembly 20 may be eliminated altogether if it is certain that the ambient light level will be high enough to obtain high quality color images. In another embodiment, red LEDs are employed instead of the white LEDs.

Color imager 34 may be of any suitable type, but there is shown by way of example, a CMOS color imager having a 640×480 pixel resolution. It will be apparent to those of ordinary skill in the pertinent art that modifications and variations can be made to color imager 34 of the present invention depending on cost and the resolution required by optical reader 10. In another embodiment, color imager 34 has 800× 600 pixels. A typical VGA resolution of 640×480 pixels is adequate for displaying color images on a LCD or a computer monitor. In one megapixel embodiment, color imager 34 has 1156×864 pixels (almost 1-million pixels). In yet another embodiment, color imager 34 includes 1536×1024 pixels. One of ordinary skill in the art will recognize that as the resolution of imager 34 increases, so will the cost. In another embodiment, color imager 34 is implemented by scanning a linear CCD array. In other embodiments, color imager 34 is implemented using an area CCD solid state image sensor.

Processor 40 may be of any suitable type, but there is shown by way of example a processor which includes microprocessor 42 and ASIC 44 coupled to system bus 52. In one embodiment, microprocessor 42 and ASIC 44 are programmable control devices that receive, process, and output data in accordance with an embedded program stored in EROM 48. As discussed above, microprocessor 42 and ASIC 44 are connected to system bus 52, which includes address, data, and control lines.

In the embodiment depicted in FIG. 2, microprocessor 42 is an off-the-shelf VLSI integrated circuit (IC) microprocessor. Microprocessor 42 is tasked with the over-all control of the electro-optics shown in FIG. 2. Processor 42 controls menu operations, command and data received from I/O circuit 50, data written to display 60, and operating system functions. I/O circuit 50 controls the information received from keypad 14 and keypad 16. Microprocessor 42 is also tasked with processing and decoding imaging data stored in RAM 46 in accordance with the programming instructions stored in EROM 48. Thus, microprocessor 42 performs bar code decoding, optical character recognition, signature verification, and color image processing.

In the embodiment depicted in FIG. 2, ASIC 44 is implemented using a programmable logic array (PLA) device. In a similar embodiment, ASIC 44 is implemented using a field programmable gate array (FPGA) device. ASIC 44 is tasked with controlling the image acquisition process, and the storage of image data. As part of the image acquisition process, ASIC 44 performs various timing and control functions including control of light source 24, control of color imager 34, and control of external interface 56. It will be apparent to those of ordinary skill in the pertinent art that modifications and variations can be made to processor 40 of the present invention depending on the cost, availability, and performance of off-the-shelf microprocessors, and the type of color imager used. In one embodiment, microprocessor 42 and ASIC 44 are replaced by a single microprocessor 40. In one embodiment, microprocessor 40 is implemented using a single RISC processor. In yet another embodiment, microprocessor 40 is implemented using a RISC and DSP hybrid processor.

It will be apparent to those of ordinary skill in the pertinent art that modifications and variations can be made to the memory configuration of the present invention depending on cost and flexibility considerations. For example, in one embodiment, EROM 48 is implemented using EPROMs or E2PROMs. In yet another embodiment, FLASH memory is employed. RAM 46 typically includes at least one volatile memory device, and in some embodiments includes one or more long term non-volatile memory devices.

It will be apparent to those of ordinary skill in the pertinent art that modifications and variations can be made to I/O unit 50 of the present invention depending on the application and work environment. Embodiments of I/O unit 50 include an RS-232 interface, a LAN interface, PAN interface, a serial bus such as USB, an internet interface, and a wireless interface.

External interface 56 is used to transmit a discrete signal to control a peripheral device. Typically, the peripheral is an external illuminator. The external illuminator is used in place of light source 24.

It will be apparent to those of ordinary skill in the pertinent art that modifications and variations can be made to the operating system employed by optical reader 10 depending on the applications and desired operating environment. In one embodiment, a WindowsCE operating system is employed. In other embodiments, LINUX or PalmOS operating systems are employed. As a non-limiting example, application programs can be written using C, C++, Visual Basic, or Visual C++. Other languages can be used as well, depending on the application program. In other embodiments, optical reader 10 does not employ an operating system. For example, the simple reader depicted in FIG. 1D does not require a complex operating system.

As embodied herein and depicted in FIG. 3, an example of a graphical user interface in accordance with the present invention is disclosed. Display 60 provides a plurality of application program icons displayed on graphical user interface (GUI) 650. Selections are made by the user via arrow 652. For example, GUI 650 allows a user to select the automatic image capture mode by clicking on automatic mode icon 654. GUI 650 also includes semi-automatic image capture icon 656, bar-code scanning icon 658, OCR/text capture icon 660, signature capture mode icon 662, color photography mode icon 664, association mode icon 668, and additional application program icons 666. The application program icon 666 may allow the user to collect other biometric information such as finger and voice prints. In the WindowsCE environment, start button icon 670 and tool bars may also be displayed on GUI 650. GUI 650 also displays current application program data 672.

In the automatic imaging mode, processor 40 is programmed to analyze the color imaging data to determine if an acquired image includes a graphical symbol or is merely a color photographic image. If it makes the determination that the color image includes a graphical symbol, it further analyzes the acquired image and classifies it as a bar code, OCR symbol, text, or a signature. Based on the classification, optical reader 10 jumps to the appropriate routine in EROM 48. The semi-automatic mode is similar. Thus, in the automatic or semi-automatic modes, the bar code scanning mode, the OCR/text mode, the signature capture mode, the color photography mode, and the association mode are controlled by the application program, not by the user.

However, the user may manually select any of the above listed modes. If the user clicks on bar code scanning icon 658, the bar code scanning application program will run. In this application program, the user may select between a 1D bar code mode, 2D bar code mode or an autodiscrimination mode. Further, the user can manually select and de-select the types of bar codes optical reader 10 is enabled to read or not read.

The user may also click on OCR/Text icon 660. Clicking icon 660 provides the user with a check validation mode, a text scanning mode, or a bi-tonal image capture mode. The check validation mode is performed in conjunction with network services.

Clicking on icon 662 provides the user with a signature capture mode. In one embodiment, this mode includes a signature verification program wherein the user may select between a static verification or a dynamic verification. In the static mode, the user captures the image of a signature. The captured image is compared with a reference image stored in a remote database. In the dynamic mode, optical reader 10 uses the stylus and signature block to capture the signature. In this mode, signature block 62 measures unique dynamic parameters, such as applied pressure, direction and timing of movements, or a combination of these parameters. One of ordinary skill in the art will recognize that this list is not meant to be all-inclusive, but rather, is a representative example. The captured dynamic parameters are compared with a reference data stored in a remote database.

The user selects the color photography mode by clicking on icon 664. This mode allows the user to select an automatic imaging mode wherein optical reader 10 makes the imaging adjustments (e.g., exposure, etc.) or a manual mode that allows the user to adjust imager settings as he pleases.

In another embodiment, display 60 provides the user with a menu listing the main modes of optical reader 10. The user employs keypad 16 to select the desired mode. A cursor key is employed to highlight any of the modes listed above. Upon pressing the enter key, processor 40 jumps to the appropriate routine stored in EROM 48. As discussed above, a user may select between an Automatic Imaging mode, a Semi-Automatic Imaging mode, a bar code scanning mode, an OCR/text mode, a signature capture mode, a color photography mode, or an association mode.

Figure 4:
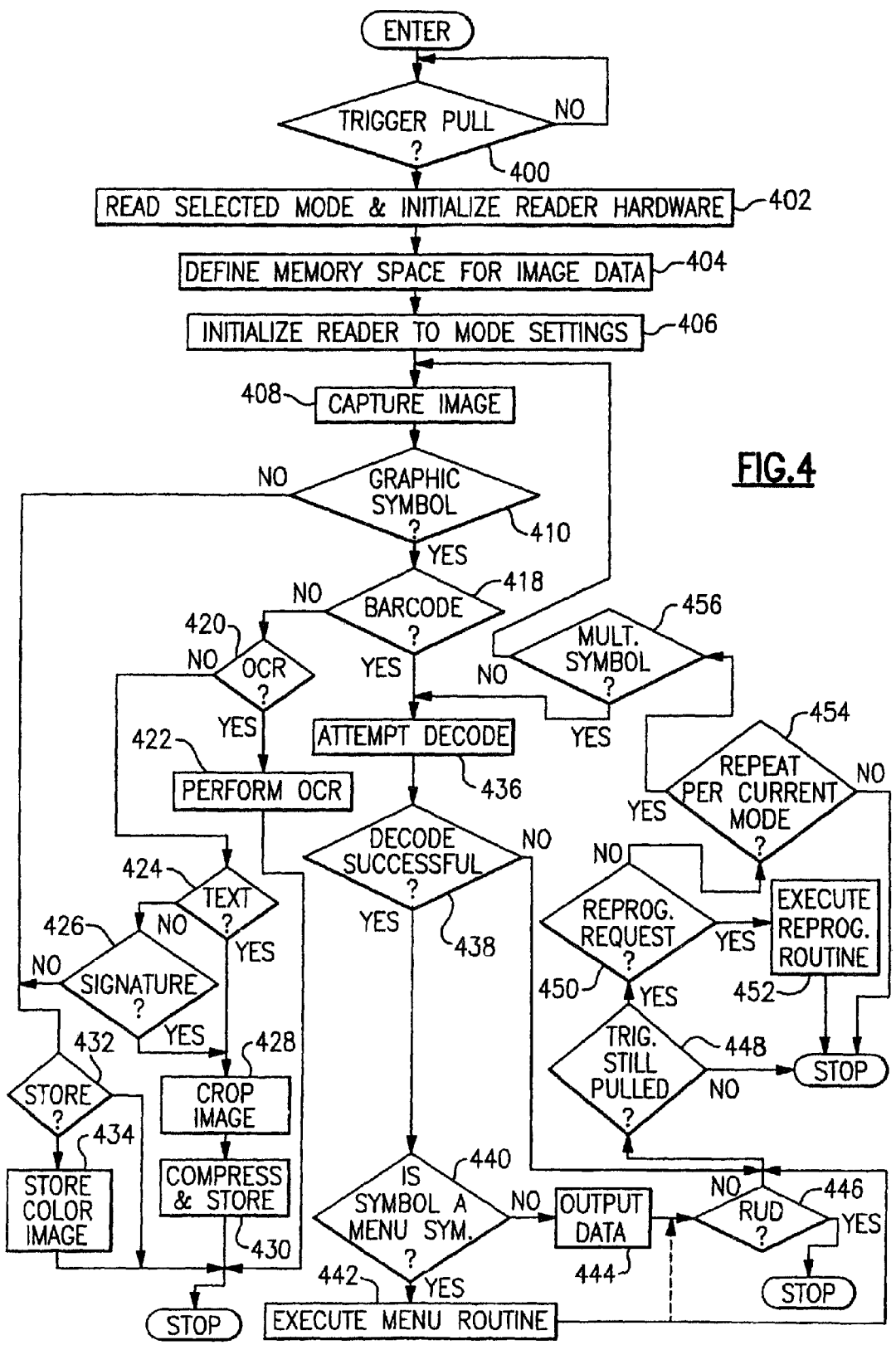
FIG. 4 is a flow chart showing the processing flow for an automatic mode in accordance with another embodiment of the present invention.

As embodied herein and depicted in FIG. 4, a flow chart showing the processing flow for the automatic imaging mode in accordance with another embodiment of the present invention is disclosed. After the user pulls the trigger in step 400, processor reads the selected mode. In this case the automatic mode has been selected by the user. The processor initializes optical reader 10 hardware, defines image data memory space, and initializes software mode settings. In step 408, optical reader 10 captures the image by obtaining color imaging data. In some embodiments, processor 40 may display the acquired image on display 60 during this step. In step 410, processor 40 determines if the captured image includes a graphical symbol. In one embodiment, processor 40 uses only a portion of the color imaging data to make this determination. Because there are more green pixels than either red or blue pixels in the Bayer-Pattern, processor 40 uses the green pixels to look for high energy regions in the acquired image. High energy, e.g. black-white transitions is a good indicator for the presence of a graphical symbol, such as a bar code symbol. A black and white bi-tonal image will consist of green pixels that are in one of two possible value ranges. One narrow range of values is representative of white portions of the image, whereas the other narrow range of values is representative of black portions of the image.

In another embodiment, step 410 is performed by considering all of the pixel values. However, the interpretation of the pixel's value is adjusted based on whether it is a red, green, or blue pixel. In another embodiment, processor 40 creates a gray-scale image to determine whether the image includes a graphical symbol.

If in step 410 processor 40 determines that there is no graphical symbol present in the image, the user is asked in step 432 if he desires to store the image. If so, the color photographic image is stored in memory in step 434. If processor 40 determines that the image includes a graphical symbol, the process flow moves on to step 418. In this step, processor 40 strikes scanning lines to locate bar code symbol identifiers. If processor 40 determines that the graphical symbol is a bar code symbol it attempts to decode the symbol in step 436. If the decoding is successful, the symbol may be a menu symbol or a data symbol. If it is a data symbol, the decoded value of the bar code symbol is output to the display. If it is a menu symbol, a menuing routine is executed. The menu symbol is discussed in more detail below.

If processor 40 does not locate a bar code symbol it moves onto step 420 and looks for OCR-A or OCR-B characters. If it finds these characters it performs optical character recognition in step 422. If it does not, processor evaluates the image for the presence of text. If text is located, the image is cropped, and the text is compressed and stored in steps 428 and 430. If the image does not include text, processor 40 evaluates the image for the presence of a signature. If one is present, the image is cropped, and the data is compressed and stored in steps 428 and 430. In another embodiment, optical reader 10 is networked, and processor 40 communicates with remote network resources to provide signature verification services. If processor 40 cannot detect a bar code symbol, OCR symbols, text, or a signature, the user is asked in step 432 if he desires to store the image. If he does, the color photographic image is stored in memory in step 434.

Figure 5:
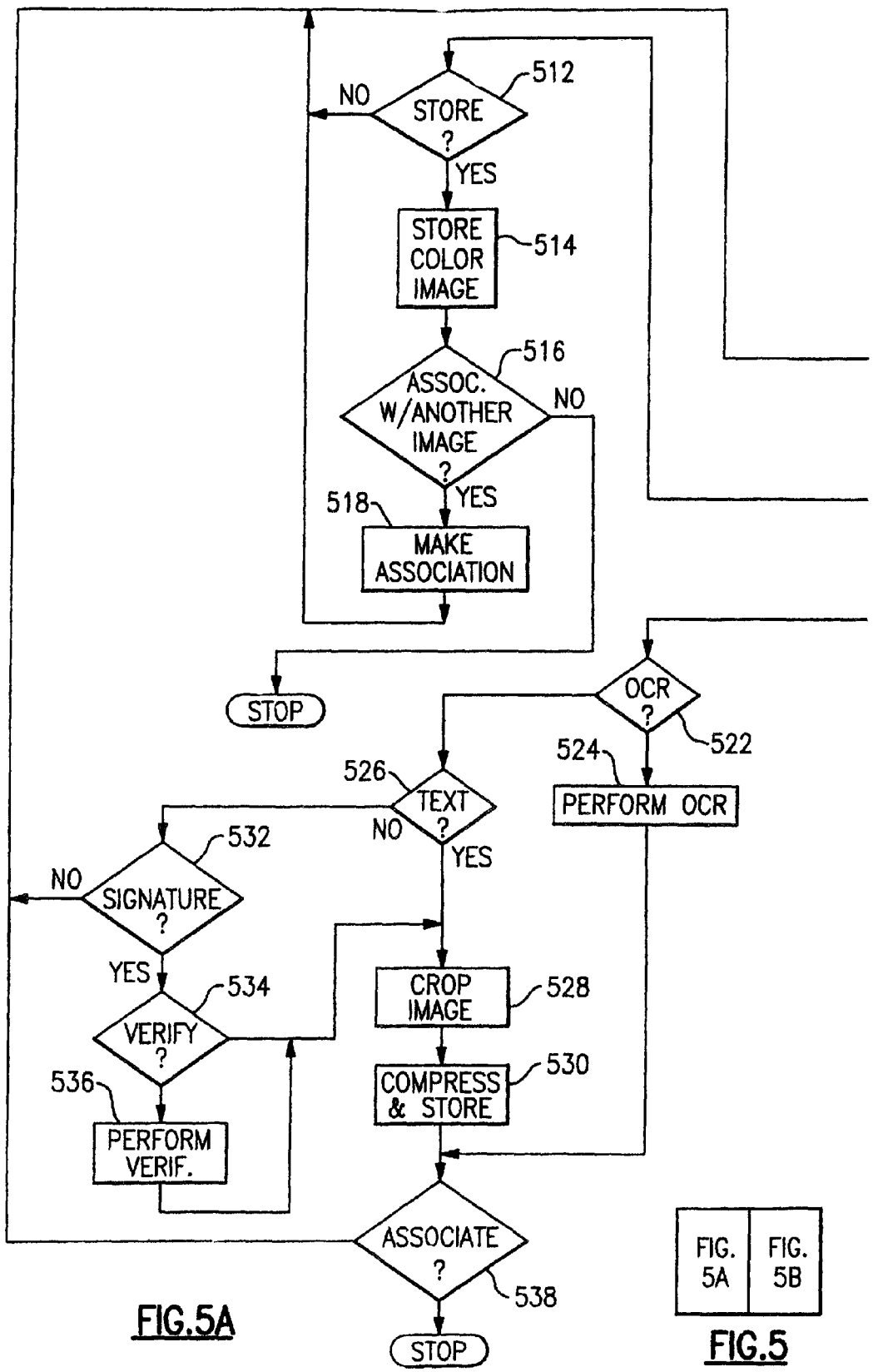
FIG. 5 is a flow chart showing the processing flow for a semi-automatic mode in accordance with another embodiment of the present invention.

As embodied herein and depicted in FIG. 5, a flow chart showing the processing flow for the semi-automatic mode is disclosed. After the user pulls the trigger in step 500, processor reads the selected mode, initializes optical reader 10 hardware, defines image data memory space, and initializes software mode settings. In step 508, optical reader 10 captures and displays the image.

In step 510, processor 40 determines if the captured image includes a graphical symbol. Step 510 in the semi-automatic mode is identical to step 410 in the automatic mode. If processor 40 determines that the captured image does not include a graphical symbol, processor 40 asks the user if she wants to store the color image. If so, the color image is stored in step 514. In step 516, a prompt asks the user if he desires to associate the color image with another image. This step is not performed in the automatic mode. In step 518, if the user answers in the affirmative, the association is made and the processing flow returns to step 508.

In steps 520, 522, 526, and 532, the user is given the opportunity to select the type of graphical imaging that is to be performed. The method for performing OCR, text capture, and signature capture and/or verification are discussed above in the automatic mode description with one difference. In the semi-automatic mode, the user is asked in step 538 if he desires to associate the processed image with a subsequent captured image. If so, process flow is directed back to step 508 and another image is captured and displayed. The association feature can be used several times to associate multiple images.

If the user indicates that it is a bar code, an attempt is made to decode the symbol in step 540. Referring back to step 540, if the decoding attempt is successful, processor 40 determines in step 544 if the symbol is a menu symbol. If it is not a menu symbol, processor 40 displays the decoded bar code information on display 60. If it is a menu symbol, processor 40 executes the appropriate menu routine in step 546. In steps 552 to 564, processor 40 may continue to capture images if the trigger is continuously pulled. In step 562, the user is asked if he desires to associate the decoded bar-code with another image. If so, the program flow is directed back to step 508 and another image is captured and displayed. Processor 40 links this image to the decoded bar code information.

Figure 6:
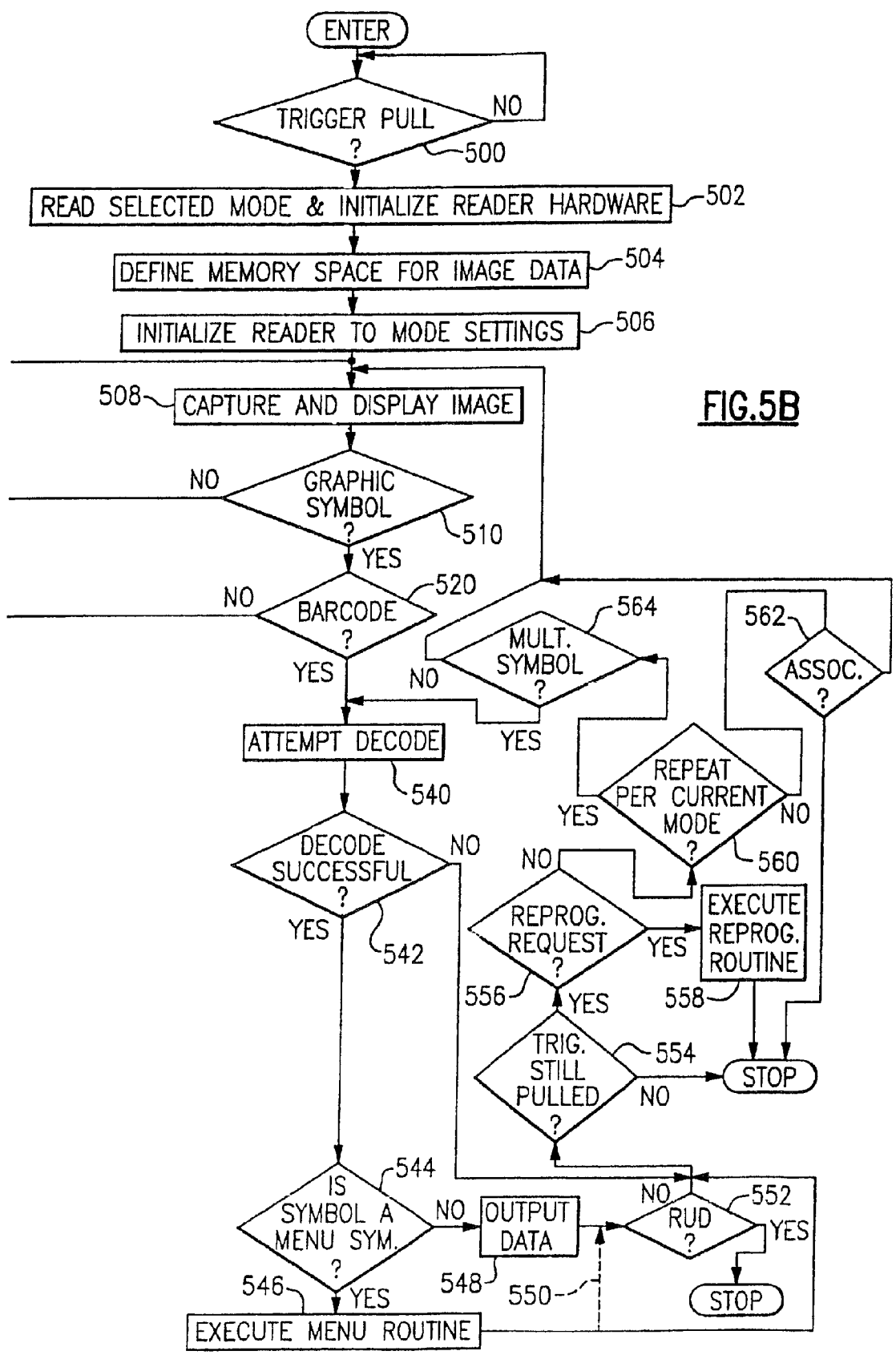
FIG. 6A-6C are graphical depictions of the menu symbol used in the bar code processing flows depicted in FIG. 4 and FIG. 5.

As embodied herein and depicted in FIG. 6A-6C, graphical depictions of the menu symbol used in the bar code processing flows depicted in FIG. 4 and FIG. 5 are disclosed. A decoded menu symbol includes menu word 600 which has the format depicted in FIG. 6A. Menu word 600 includes a one byte product ID code 600-1, that identifies the type and model of the optical reader. Field 600-2 of word 600 specifies the op-code. The op-codes are depicted in FIG. 6C. Op-code 0 refers to vector processing operations that are listed as A1-A4 in FIG. 6C. Vector processing allows the user to download, enabled codes, the parameter table, or current software to an external device. Op-codes 1-7 allow a user to modify a specific portion of the parameter table. These op-codes are used in conjunction with the offset field 600-3 and data fields 600-4 to 600-7. Offset field 600-3 is an index relative to the base address of the parameter table in memory that specifies the exact location in the parameter table. The data fields 600-4 to 600-7 are used to specify a bit mask that indicates which bits are to be modified. FIG. 6B depicts a second important group of options. For example, reader operating modes are included in F1-F6. These options are identical to the icons displayed on GUI 650 in FIG. 3. Offset field 600-3 accommodates other optical reader 10 options as shown.

Figure 7:
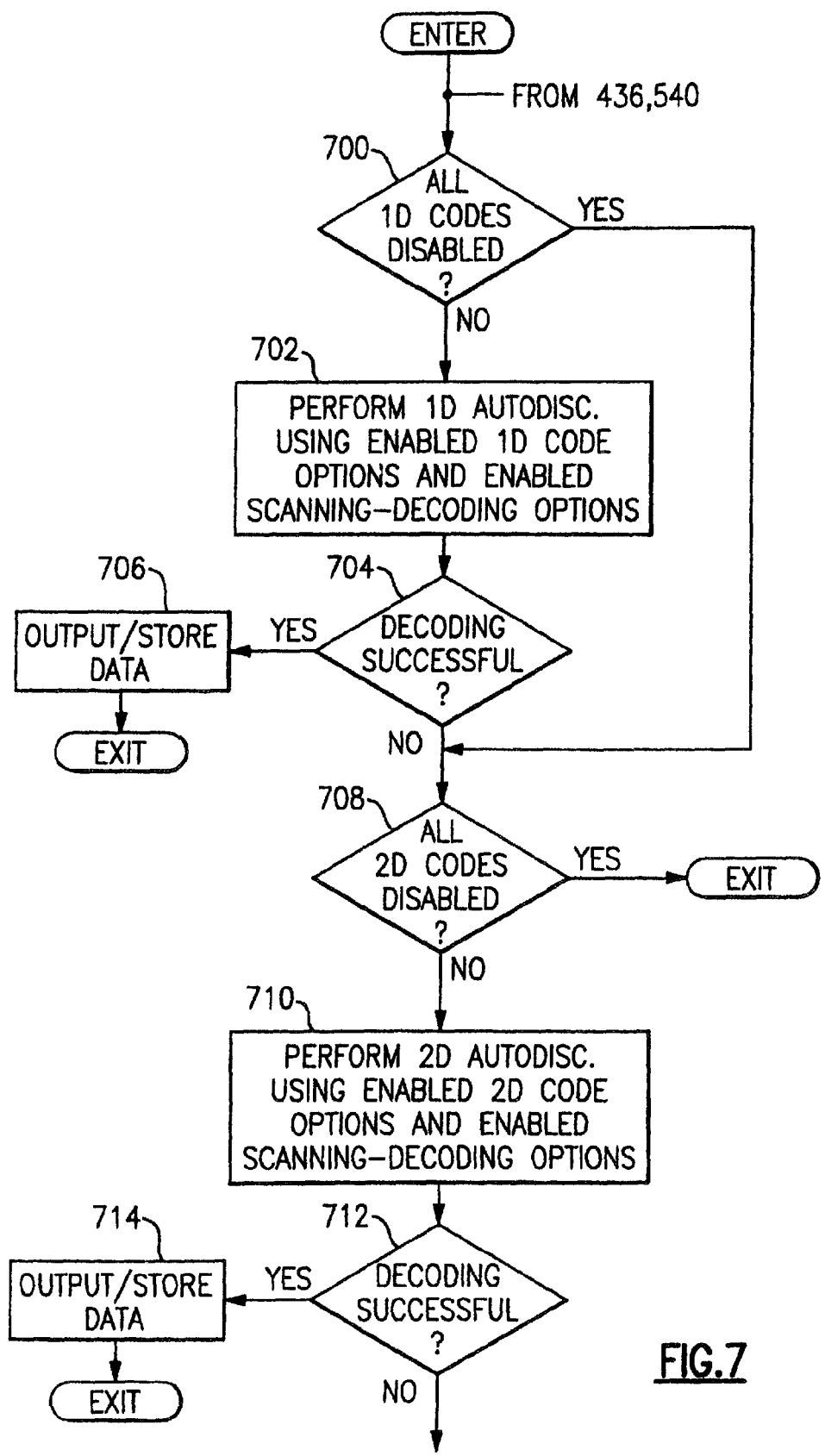
FIG. 7 is a flow chart showing a method for reading a bar code in accordance with yet another embodiment of the present invention.

As embodied herein and depicted in FIG. 7, a flow chart showing a method for reading a bar code in accordance with yet another embodiment of the present invention is disclosed. In step 700, processor 40 refers to a parameter table stored in EROM 48. Specifically, processor 40 determines if the parameter table is programmed to perform 1D decoding. If the parameter table has enabled 1D processing, 1D autodiscrimination is performed. The parameter table specifies the values of the parameters that define the operational mode of the reader. Examples of these parameters include the size and frame rate of the color imager, codes that are enabled during bar code decoding, I/O communications protocols, OCR options, and others. If 1D decoding is successful, the decoded data is stored or displayed, in accordance with the parameter table settings. If 1D codes are disabled or if 1D decoding is unsuccessful, processor moves on to step 708. In this step, processor 40 determines if any 2D codes are enabled. If the parameter table has all of the 2D codes disabled, processor 40 exits the bar code decoding routine. If 2D codes are enabled, 2D autodiscrimination is performed in step 710. If decoding is successful, the decoded data is either stored or output, depending on the parameters stored in the parameter table. If decoding is unsuccessful, processor exits the routine.

Figure 8:
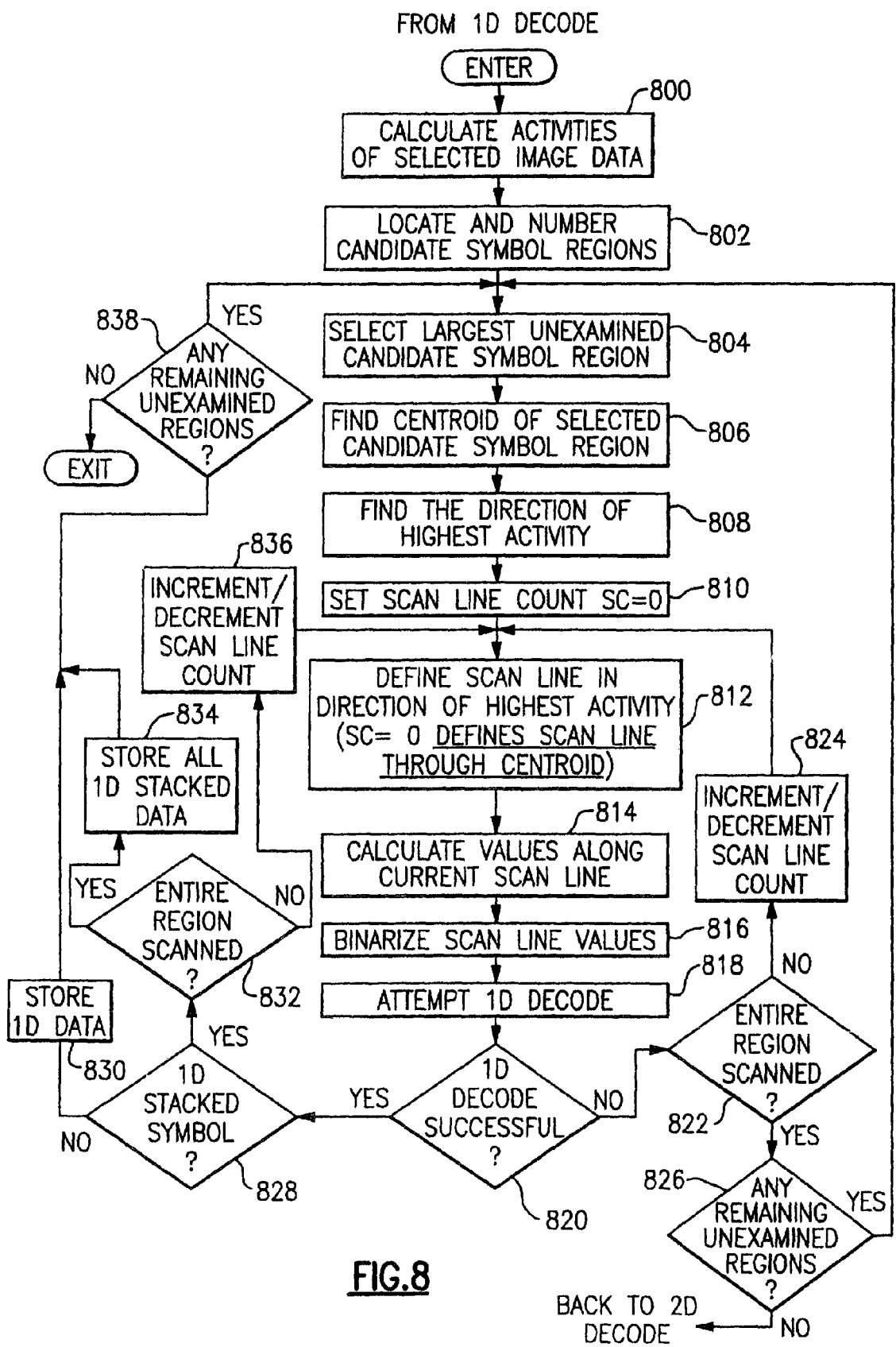
FIG. 8 is a flow chart showing a method for 1D autodiscrimination in accordance with the method depicted in FIG. 7.

As embodied herein and depicted in FIG. 8, a flow chart showing a method for performing the 1D autodiscrimination of step 702 in FIG. 7 is disclosed. In step 800, processor 40 calculates the activities of selected image data elements. The activity is defined as a measure of the rate of change of the image data over a small two-dimensional portion of the region surrounding the selected data element. In one embodiment, the activity is calculated along any two arbitrarily selected directions which are orthogonal one to the other. Two mutually perpendicular directions are used because the orientation of the symbol is unknown. In step 802, processor 40 looks for "high activity" regions. These high activity regions are referred to as candidate symbol regions (CSRs). A high activity region indicates a transition from a black region to a white region, or vice-versa. If there is more than one CSR, it may indicate the presence of more than one bar code symbol. In step 804, processor 40 selects the largest CSR. In step 806, processor 40 calculates the centroid of the largest CSR. Subsequently, processor 40 finds the direction of the highest activity in the largest CSR. In a 1D bar code, this will be the direction perpendicular to the direction of the bars. In steps 810 and 812, processor 40 defines the initial scan line (SC=0), as being the scan line bisecting the centroid of the bar code. Processor calculates the brightness values of sampling points along the initial scan line. These brightness values are converted to digital data in step 816. In decoding step 818, processor 40 applies one 1D decoding program after another. If decoding is unsuccessful, processor 40 checks if the entire CSR has been scanned. If not, it establishes a new scan line, and repeats the decoding process. If in step 822, the entire CSR has been scanned, and there are no CSRs remaining to be decoded, processor 40 exits the routine. If in step 820, 1D decoding is successful, processor 40 determines if the symbol is a 1D stacked symbol. If it is a 1D stacked symbol, processor 40 scans and decodes the remaining CSRs in the stacked symbol. If it is not a stacked symbol, the decoded 1D data is stored or output to display 60 in step 830. In step 838, processor 40 determines if there any unexamined regions. If there are unexamined regions, the decoding process is repeated. Otherwise, processor 40 exits the routine.

Figure 9:
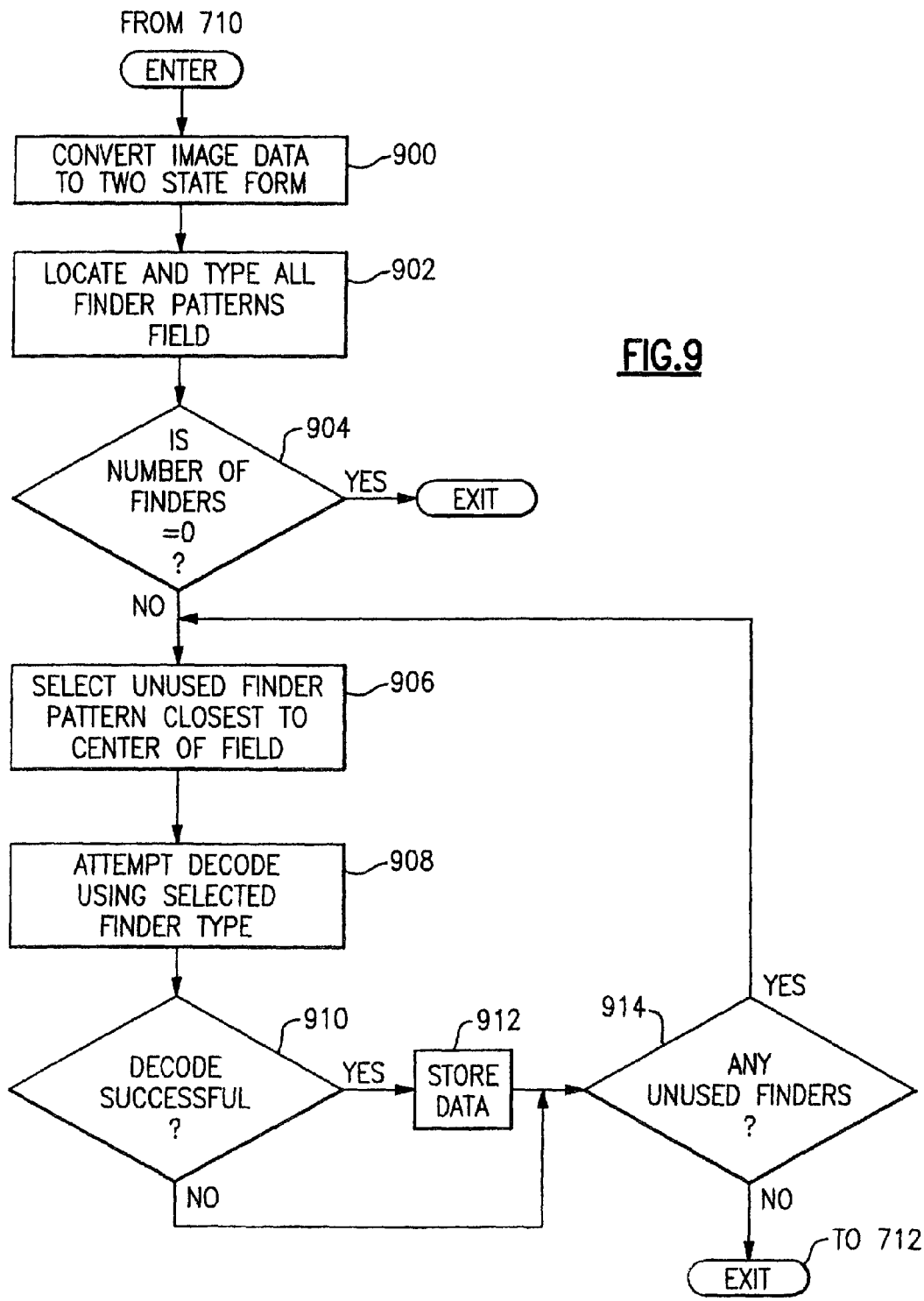
FIG. 9 is a flow chart showing a method for 2D autodiscrimination in accordance with the method depicted in FIG. 7.

As embodied herein and depicted in FIG. 9, a flow chart showing a method for 2D autodiscrimination is disclosed. In step 900, processor 40 converts the image data into a two-state binarized format. In step 902, processor 40 locates all 2D finder patterns and identifies them by type. Pattern types include bulls-eye type patterns, waistband type patterns peripheral patterns, and others. If the number of finder patterns equals zero, processor 40 exits the routine. If there are finder patterns, processor 40 locates the finder pattern closest to the center of the field of view in one embodiment of the invention. The closest-to-the-center option has an advantage in that a centrally located image is likely to be a symbol. In step 908, processor 40 attempts to decode the symbol in accordance with the finder type. For example, the Aztec 2D matrix symbol employs a bulls-eye finder pattern. The DataMatrix symbology employs a peripheral finder pattern. If the decoding is successful, the decoded data is either stored or displayed. In step 914, processor 40 determines if there are any other unused finder patterns. If so, the symbols corresponding to those unused patterns are decoded, and the previously described steps are repeated. Otherwise, processor 40 exits the routine.

Figure 10:
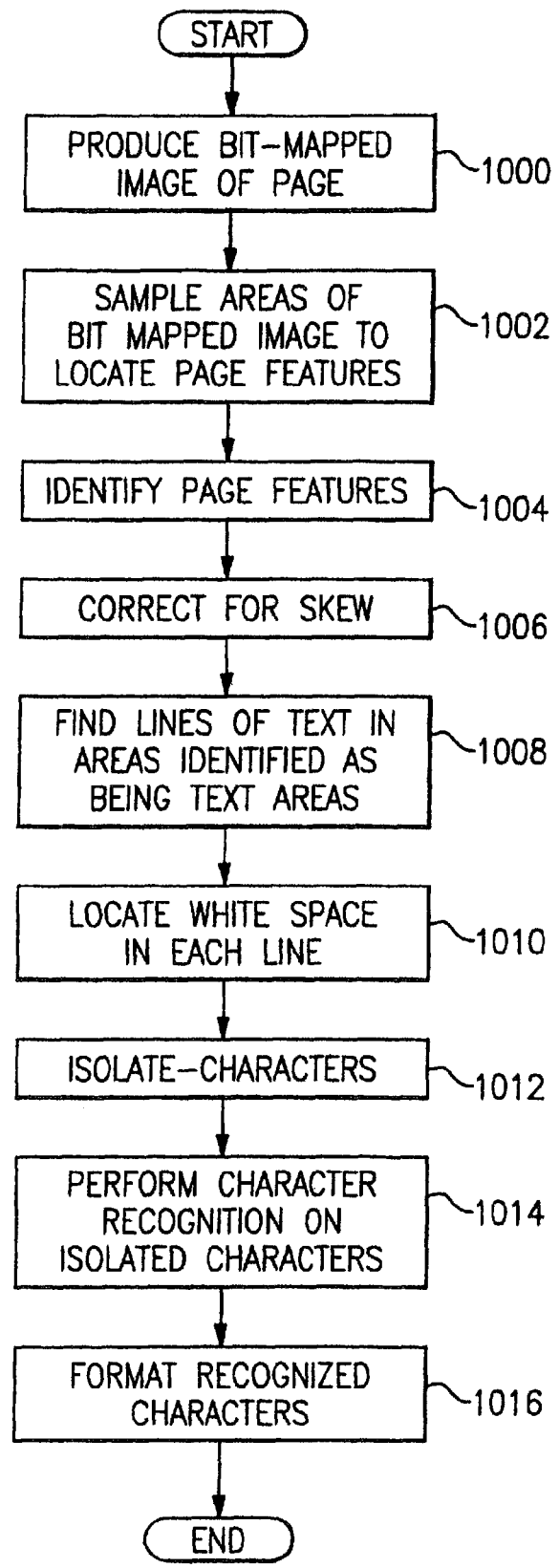
FIG. 10 is a flow chart showing a method for reading text in accordance with yet another embodiment of the present invention.

As embodied herein and depicted in FIG. 10, a flow chart showing a method for reading text in accordance with yet another embodiment of the present invention is disclosed. This routine can be accessed in a number of ways as described above. In step 1000, a bit-map image of the page is produced. In step 1002, the bit mapped image is sampled. In one embodiment, this is performed by analyzing every Nth scan line of the bit mapped image. The value of integer N is dependent on the resolution of the scanned image. In one embodiment the image is sampled every ¼₀th of an inch. This provides sufficient resolution to locate and classify the various regions on the page. By sampling every ¼₀th of an inch instead of every scan line, the processing and memory requirements of reader 10 are substantially reduced. In step 1004, processor 40 identifies the page features. Processor 40 analyzes the page and divides it into blank and non-blank portions. The non-blank portions are analyzed to distinguish text regions from non-text regions. After determining the layout of the page, processor 40 uses black-to-white transitions to determine degrees of skew. In step 1008, horizontal white spaces are identified to separate lines of text. In step 1010, vertical white spaces are identified within each line of text to thereby separate individual words and characters from each other. In step 1014, a character recognition algorithm is used in an attempt to recognize each individual character. Finally, in step 1016, processor 40 formats the recovered text before storing the text in memory.

Figure 11:
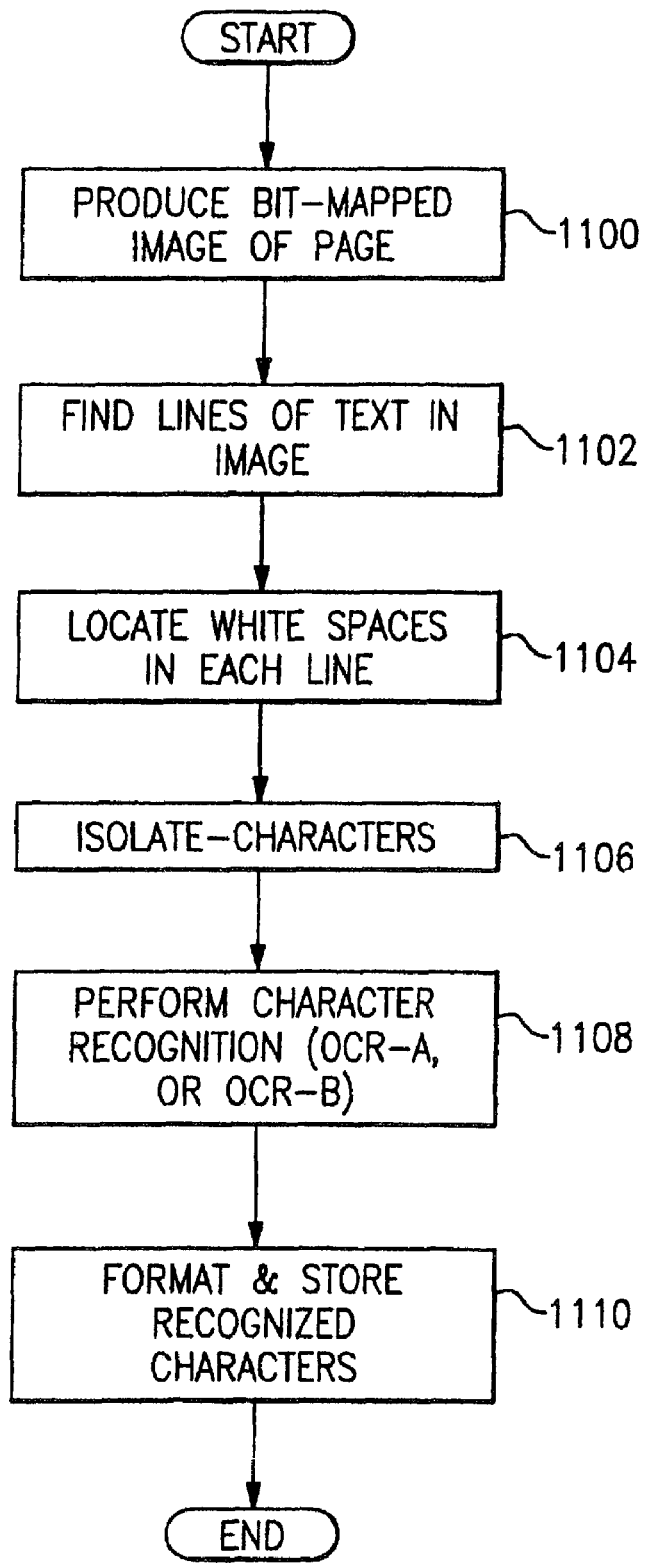
FIG. 11 is a flow chart showing a method for performing OCR in accordance with yet another embodiment of the present invention.

As embodied herein and depicted in FIG. 11, a flow chart showing a method for performing OCR in accordance with yet another embodiment of the present invention is disclosed. In step 1100, reader 10 produces a bit-mapped image of the page. Subsequently, processor 40 finds lines of text in the image, locates the white spaces in each line, and isolates the characters. In step 1108, processor 40 performs character recognition, either OCR-A or OCR-B, as desired. The decoded characters are stored in memory.

Figure 12:
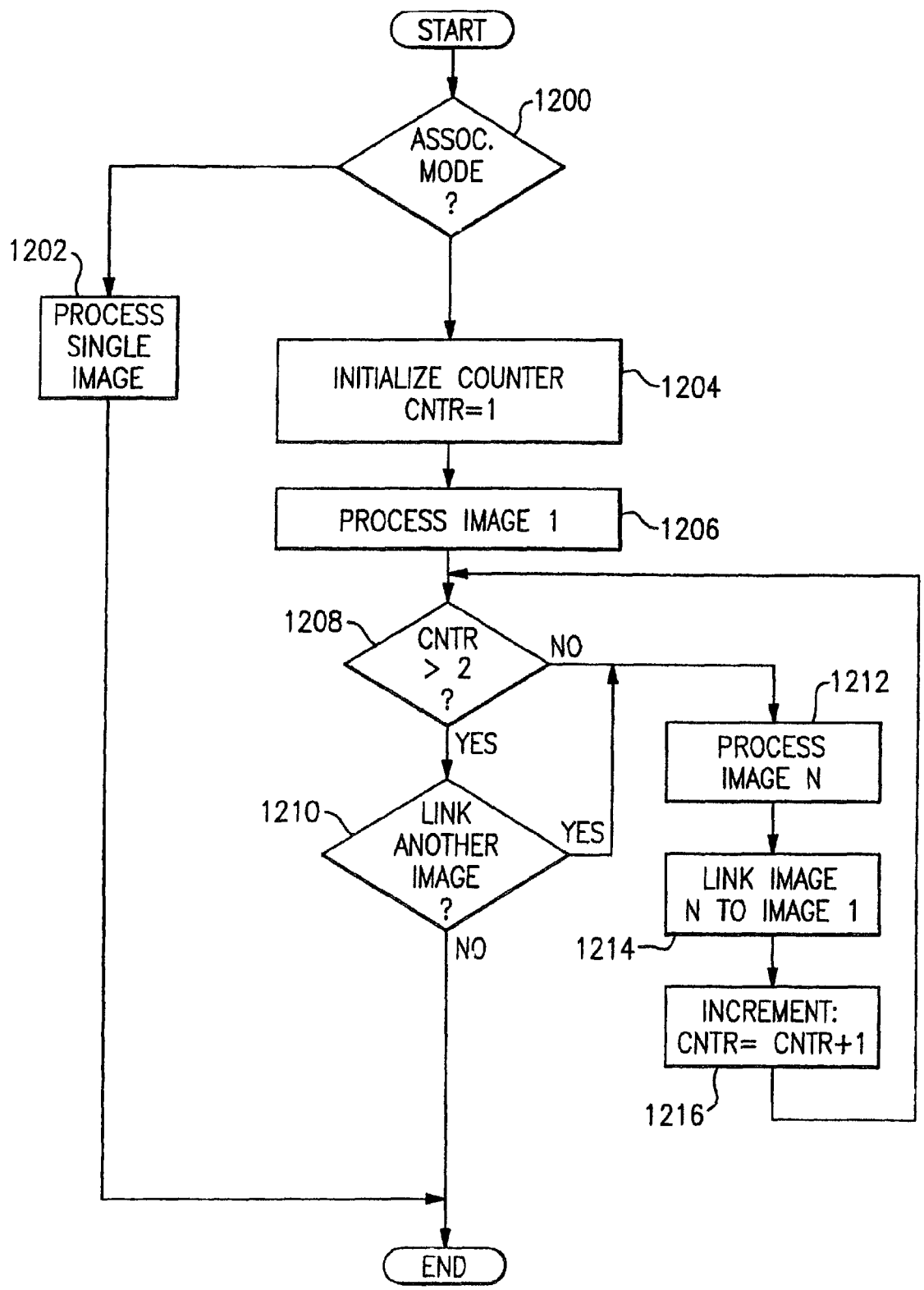
FIG. 12 is a flow chart showing a method for associating consecutive images taken with the color optical reader of the present invention.

As embodied herein and depicted in FIG. 12, a flow chart showing a method for associating consecutive images taken with the color optical reader of the present invention is disclosed. This method corresponds to icon 668 displayed on GUI 650 in FIG. 3. If icon 668 is not clicked on, processor 40 assumes that reader 10 is not operating in association mode. Thus, processor 40 will process a single image. If reader 10 is in association mode processor 40 initializes counter CNTR. In step 1206 processor 40 processes the first captured image. In step 1208, if CNTR is less than or equal to two, processor 40 processes image N, and links image N to the first image. In step 1216, CNTR is incremented by one. If CNTR is greater than two (step 1208), meaning that at least two images have already been linked, processor 40 asks the user if she desires to link another image. If so, the processing flow returns to step 1212. If not, processor 40 exits the routine.

Figure 13:
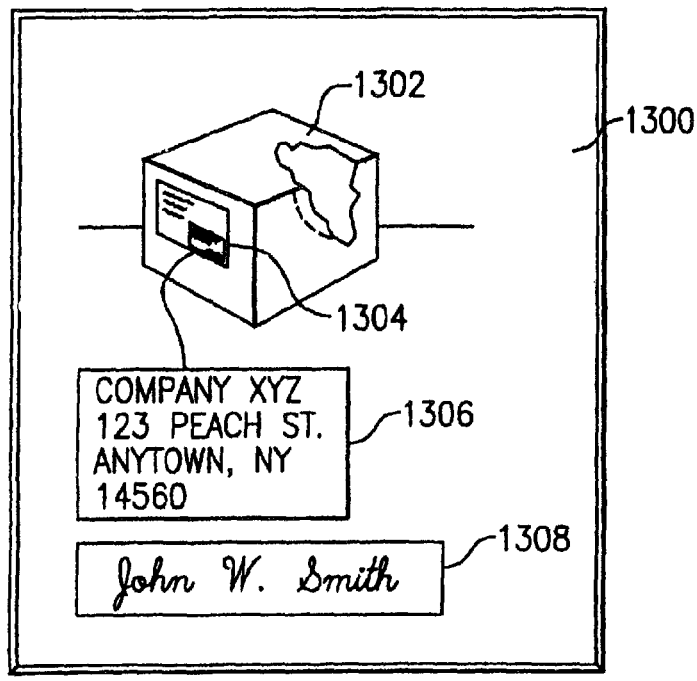
FIG. 13 is an example of image association in accordance with the present invention.

As embodied herein and depicted in FIG. 13, an example of image association in accordance with the present invention is disclosed. One or ordinary skill in the art will recognize that associated images 1300 can be disposed on paper, displayed electronically on display 60, or displayed electronically using other electronic means, such as a computer monitor. In this example, the first image captured is color photograph 1302 which shows a damaged parcel. The second image captured is bar code 1304 affixed to the side of the damaged parcel. Processor 40 decodes bar code 1304 and associates decoded bar code data 1306 with color photograph 1302. In this example, the user elected to associate a third image, signature 1308. Thus, personnel viewing record 1300 may reasonably conclude that a damaged parcel was delivered to Company XYZ, and that the person signing for the parcel delivery was someone named John W. Smith.

As embodied herein and depicted in FIG. 14, a perspective view of a wireless color optical reader network 1400 in accordance with another embodiment of the present invention is disclosed. Network 1400 includes N-cordless optical scanners 10 coupled to base terminal 202 by means of radio link 18. Base terminal 202 is connected to host computer 206 by communications link 204. Cordless optical reader 10 is of the type described above. It includes antenna 102, keypads 14 and 16, and display 60. A radio controller is included in both the optical scanner 10 and the base terminal 202. It will be apparent to those of ordinary skill in the pertinent art that radio controller may be of any suitable type, but by way of example, radio controller 30 provides frequency hopping spread spectrum communications (FHSS) between scanner 10 and base terminal 202. FHSS is a form of spread spectrum radio transmission that produces a narrow band signal that hops among a plurality of frequencies in a prearranged pattern. FHSS is often used in commercial environments because of its ability to minimize errors due to interference or jamming. However, those of ordinary skill in the art will recognize that optical scanner 10 and base terminal 202 may communicate using other wireless schemes and other modulation formats based on user requirements and environmental factors. Base terminal 202 includes antenna 208, which is used to transmit and receive messages from optical scanner 10. Antenna 208 is connected to a radio controller disposed inside terminal 202. Base terminal 202 also includes an I/O card, a base terminal processor, and a base terminal memory. The I/O card in base terminal 202 is coupled to the radio controller and communications link 204.

As embodied herein and depicted in FIG. 15, a flow chart showing a method for transmitting packetized data from a color optical reader to a base station is disclosed. In steps 1500 and 1502, optical reader 10 captures an image and processes the image as described above. In step 1504, the processed image, whether it be a color image, decoded bar codes, a text file, or signature verification information, is assembled into packets. In steps 1506 and 1508, a loop is created wherein packets are sent to the base terminal one-by-one until all packets are sent.

As embodied herein and depicted in FIG. 16A and FIG. 16B, diagrammatic depictions of packet formats in accordance with the present invention are disclosed. In one embodiment of the present invention, each packet can accommodate approximately 200 bytes of decoded data in a 256 byte packet. This is merely a representative example, and one of ordinary skill in the art will recognize that the scope of the present invention should not be limited to data packets of a certain size or format. FIG. 16A shows data packet 1600 which is used to transmit decoded data from an optical reader to a base terminal when only one data packet is required. Packet 1600 includes an optical reader address field, sequence number field, a packet length field, an image type field, image data, and an error check field. The optical reader address identifies a particular optical reader. Each packet includes a sequence number disposed in the second field. The next field contains the length of the image data field. After this, the packet contains a field identifying the type of image that was processed. After the image type, the image data payload of the packet is inserted. Finally, packet 200 includes an error checking field.

FIG. 16B shows header packet 1602 and data packet 1604 used to transmit decoded data from an optical scanner to a base terminal when more than one data packet is required. When more than one packet is required, reader 10 first transmits header packet 1602. After base terminal 202 acknowledges that it can process the remaining packets, reader 10 transmits remaining packets 1604. If base terminal 202 cannot process the remaining packets 1604, or if there is another problem, base terminal 202 will transmit an application packet to scanner 10 indicating the error. The definitions of the scanner address field, the sequence number field, symbol type, length, symbol data, and error check field were described above, and hence, will not be repeated. Header packet 1602 also includes a header identification field, which identifies the packet as a header packet. In the next field, packet 1602 includes a total length field, which includes the total length of the data contained in the decoded symbol. The next field includes the total number of packets in the message. The second-to-last field is the packet number. In the header packet, this number is designated as packet number "one." The remaining packets 1604 also include a packet number field, which are incremented from 2 to N, depending on the total number of packets being transmitted in the message.

Packet 1600, packet 1602, and packet 1604 as described above may be of any suitable type, and are representative examples representing one embodiment of the present invention. One of ordinary skill in the art will recognize that the packets may be implemented in a variety of ways.

Figure 17:
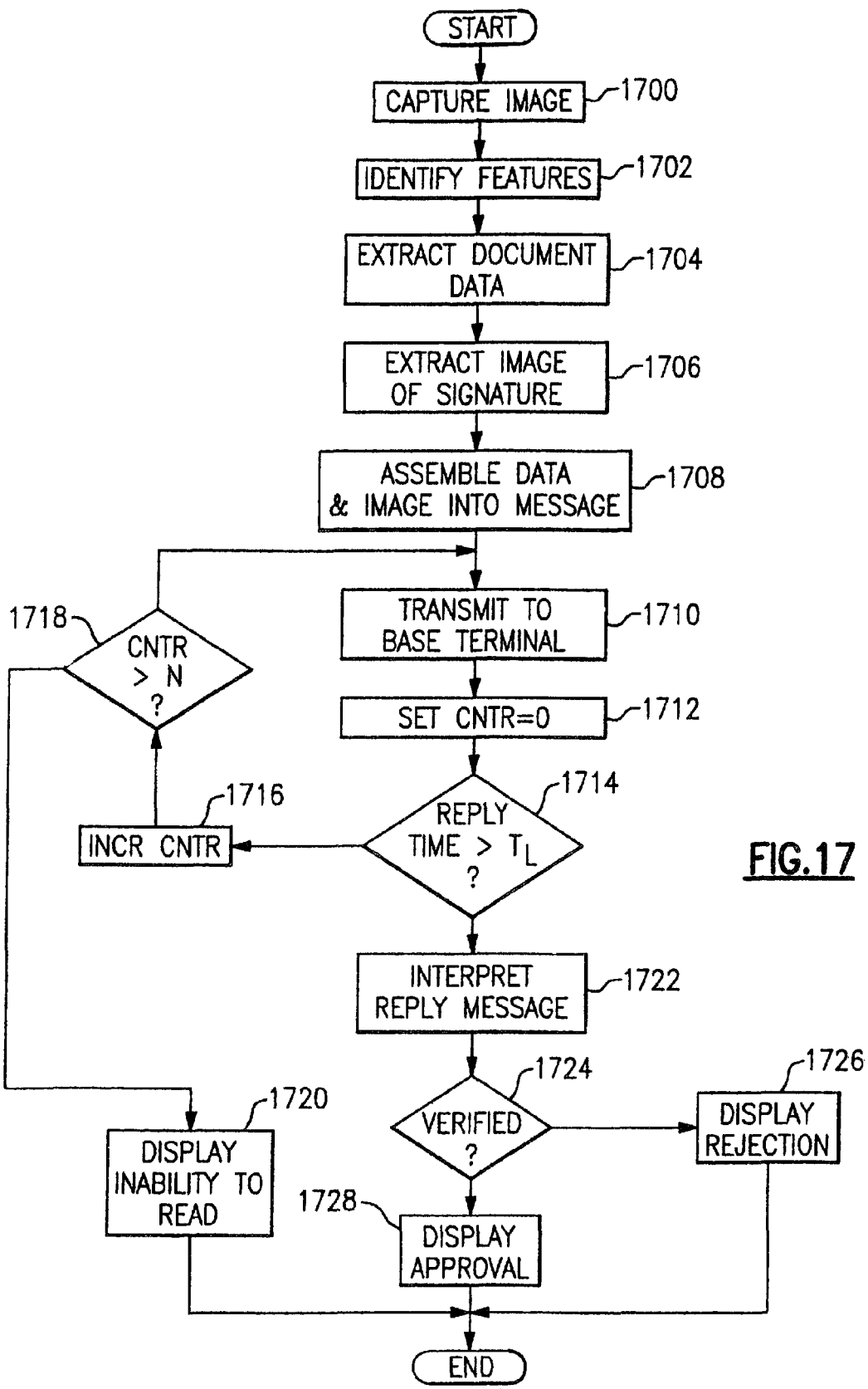
FIG. 17 is a flow chart showing a method for performing signature verification in accordance with yet another embodiment of the present invention.

As embodied herein and depicted in FIG. 17, a flow chart showing a method for performing signature verification is disclosed. In step 1700, optical reader 10 captures the image of the document to thereby generate a bit-map of the image. One of ordinary skill in the art will recognize that in the automatic mode or semi-automatic mode, processor 40 determines that the image object is a graphical symbol in a subsequent step. Step 1202 is similar to steps 1002 and 1004 of FIG. 10. The image is sampled by analyzing every Nth scan line of the bit mapped image. As discussed above, the image must be scanned in such a way so as to provide sufficient resolution to locate and classify the various regions on the document. In the case of a check, the location of the various fields on the instrument are relatively standard. Check sizes may differ somewhat, but the check number, bank code, account number, date, signature block, and etc. are in the same relative locations from check to check. In step 1704, document data such as the name, check number, bank code, account number, and date, are extracted from the document using any OCR program and stored in memory. In step 1706, the image of the hand writing in the signature block is captured.

Steps 1708 and 1710 are performed using the wireless system 1400 described above. In other embodiments these steps are performed by a wireline system. For example, in one embodiment, optical reader 10 is coupled to a host computer via an RS-232 or USB link. In another embodiment, optical reader 10 is connected to a host computer via a LAN. One of ordinary skill in the art will recognize that the present invention should not be construed as being limited by these examples.

In steps 1712 and 1714, processor 40 initializes a counter and begins waiting for a reply from the host computer. In steps 1714-1718, if the reply is not received within time limit TL, the counter CNTR is incremented and the message is re-transmitted. After several attempts, if CNTR>N (N being an integer), processor 40 outputs a fault message. If the reply message is received within time limit TL, processor interprets the reply in step 1722. If the extracted data and the signature match information stored in the database accessible by the host computer, an approval message is displayed. If the extracted data and the signature do not match information stored in the database accessible by the host computer, a disapproval message is displayed. The dynamic signature verification embodiment is similar to the static embodiment described immediately above. In the dynamic version, the user provides his signature using stylus 18 and signature block 62, as shown in FIG. 1C. Signature block 62 provides processor 40 with the dynamic parameters recorded during signature. The dynamic parameters are transmitted to a host processor, as described above.

Figure 18:
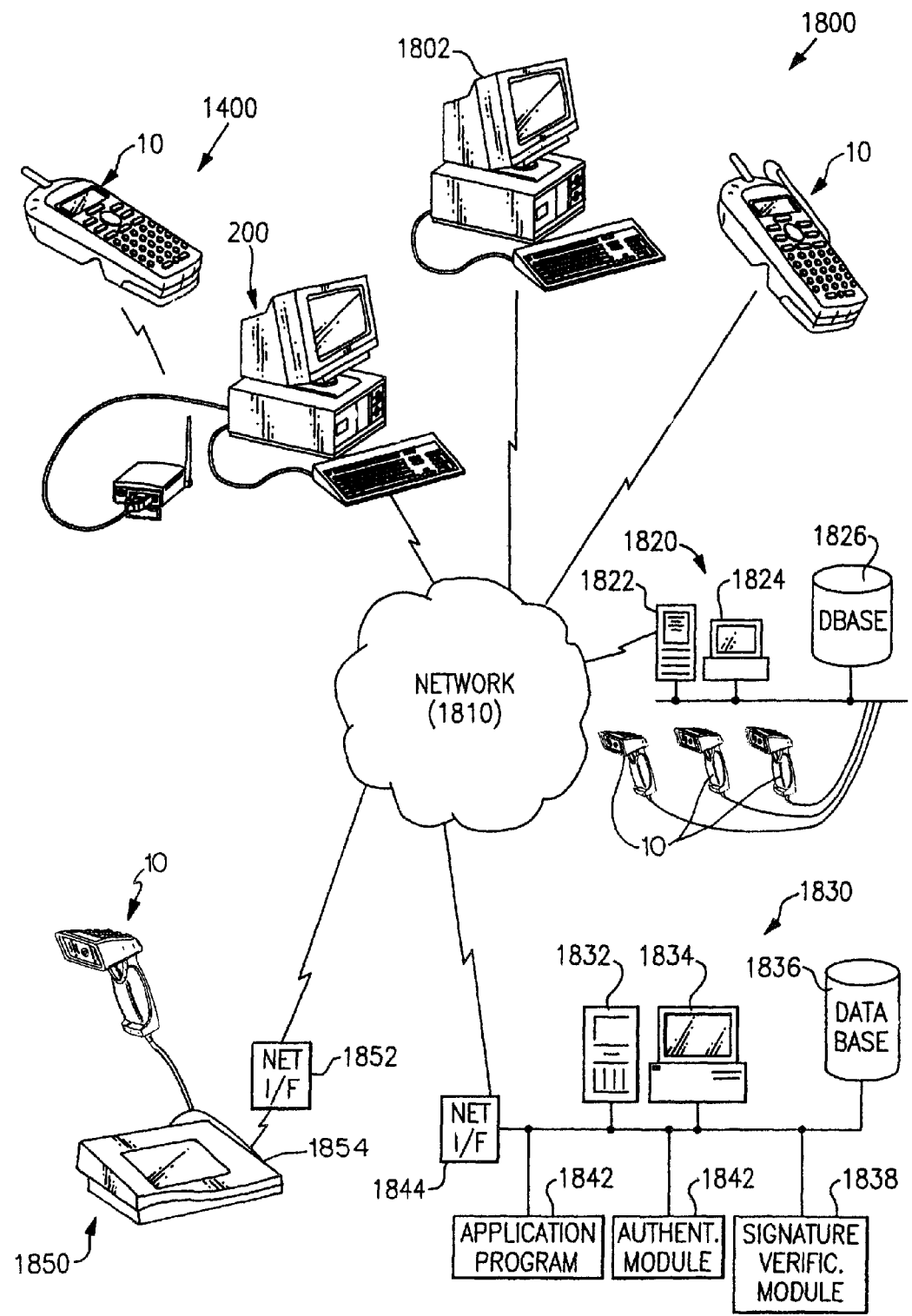
FIG. 18 is a diagrammatic depiction of color optical reader network applications in accordance with the present invention.

As embodied herein and depicted in FIG. 18, an example of a color optical reader network 1800 in accordance with the present invention is disclosed. Network 1800 includes wireless system 1400, personal computer 1802, optical reader 10, LAN 1820, network servicing center 1830, and personal area network (PAN) coupled together via network 1810.

One of ordinary skill in the art will recognize that network 1810 may be of any suitable type depending on the application, but there is shown by way of example the Internet. However, the present invention should not be construed as being limited to this example. In another embodiment, network 1810 is a private network. Those of ordinary skill in the art will also recognize that network 1810 is a wireline network in one embodiment, and a wireless network in another embodiment. Network 1810 may include circuit switched networks, IP networks, or both.

LAN 1820 includes server 1822, computer 1824, database 1826, and a plurality of optical readers 10. Database 1826 is used to store associated images along with other data fields. For example, it would be rather useful to store additional information with the associated images shown in FIG. 13. One may want to associate the delivery means, route, driver, and other related information for subsequent analysis. Network 1810 allows reader 10, PAN 1850, and wireless system 1400 a way to store such data in database 1826. System analysts can access this information via personal computer 1802 connected to network 1810. In one embodiment, LAN 1820 includes an Internet website. In this embodiment, users are authenticated before gaining access to database 1826.

Network servicing center 1830 is coupled to network 1810 via interface 1844. Center 1830 also includes server 1832, computer 1834, database 1836, signature verification module 1838, authentication module 1840, coupled together via a LAN. Center 1830 accommodates any number of useful applications programs 1842.

PAN 1850 includes at least one color optical reader 10 coupled to point-of-sale (POS) terminal 1854. POS terminal 1854 is coupled to network 1810 via interface 182. POS terminal 1854 includes a credit card reader and a signature capture block. In the scenario depicted in FIG. 18, a merchant user of POS terminal 1854 transmits an associated customer credit card number, signature, and in one embodiment, a color image of the customer, to Center 1830. Authentication module 1840 is used to authenticate the credit card and signature verification module is used to authenticate the signature. In another embodiment, database 1836 is used to store the customer's image, credit card number, and signature for verification purposes.

The present invention relates to an optical reader that includes a color imaging assembly that generates color imaging data. An image analysis circuit determines if the acquired image should be characterized as a color photograph or as including a graphical symbol. A processing circuit processes the imaging data based on the image analysis circuits determination of whether the image is a graphical symbol or a color photograph. The present invention allows a user to acquire and process both color images and graphical symbols, such as bar codes, text, OCR symbols or signatures. The optical reader of the present invention is also configured to associate an acquired image with at least one other acquired image.

A small sampling of the systems, methods, and apparatus that are described and defined herein is as follows:

A1. An optical reader comprising: a color imaging assembly for acquiring an image of an object, the color imaging assembly generating color imaging data corresponding to the image; an image analysis circuit coupled to the color imaging assembly, the image analysis circuit being configured to determine if the color imaging data includes at least one graphical symbol, whereby the image is classified as a graphical symbol image if the color imaging data includes at least one graphical symbol, or the image is classified as a color photograph if the color imaging data does not include at least one graphical symbol; and a processing circuit coupled to the image analysis circuit, the processing circuit being operative to process the color imaging data based on the classification of the image. A2. The optical reader of claim 1, wherein the processing circuit decodes a 1D 2 bar code symbol based on the classification. A3. The optical reader of claim 1, wherein the processing circuit decodes a 2D 2 bar code symbol based on the classification. A4. The optical reader of claim 1, wherein the processing circuit performs optical character recognition based on the classification. A5. The optical reader of claim 1, wherein the processing circuit performs a signature capture based on the classification. A6. The optical reader of claim 1, wherein the processing circuit stores a color image based on the classification. A7. The optical reader of claim 1, wherein the portion of the color imaging data is processed by evaluating only green pixel values in the color imaging data. A8. The optical reader of claim 1, wherein the classification circuit aggregates values of a red, blue and green triplet to form a super-pixel in the process of selecting one of a plurality of classifications. A9. The optical reader of claim 1, wherein the color imaging data is converted into a gray scale image in the process of selecting one of a plurality of classifications. A10. The optical reader of claim 1, further comprising an illumination light source including white LEDs. A11. The optical reader of claim 1, further comprising an illumination light source including red LEDs.

B1. An optical reader for capturing an image of an object, the optical reader comprising: a color imaging assembly for converting the image of the object into color digital data corresponding to the image; an automatic mode selection circuit coupled to the color imaging assembly, the mode selection circuit using at least a portion of the color digital data to select one of a plurality of operational modes of the optical reader, the operational modes including at least graphical symbol mode and a color photography mode; and a processing circuit coupled to the mode selection circuit, the processing circuit being configured to process the color digital data based on the selected operational mode. B2. The optical reader of claim B1, wherein the at least one graphical symbol mode includes decoding a 1D bar code. B3. The optical reader of claim B1, wherein the at least one graphical symbol mode includes decoding a 2D bar code. B4. The optical reader of claim B1, wherein the at least one graphical symbol mode includes optical character recognition. B5. The optical reader of claim B1, wherein the at least one graphical symbol mode includes capturing a signature. B6. The optical reader of claim B1, wherein the color photography mode includes storing a color photographic image in a computer-readable medium. B7. The optical reader of claim B1, further comprising an illumination light source including white LEDs. B8. The optical reader of claim B1, further comprising an illumination light source including red LEDs.

C1. An optical reader for capturing an image of an object, the optical reader comprising: a color imaging assembly for capturing the image as color imaging data; a classification circuit coupled to the color imaging assembly, the classification circuit being configured to process at least a portion of the color imaging data to thereby select one of a plurality of classifications, whereby the image is classified as a color photographic image, or as an image that includes at least one graphical symbol; an automatic mode selector coupled to the classification circuit, the automatic mode selector being configured to select an optical reader mode in accordance with the selected classification; and a processor coupled to the classification circuit, the processor being programmed to process the color imaging data in accordance with the optical reader mode selected by the automatic mode selector. C2. The optical reader of claim C1, wherein the portion of the color imaging data is processed by evaluating only green pixel values in the color imaging data. C3. The optical reader of 20, wherein the classification circuit aggregates values of a red, blue and green triplet to form a super-pixel in the process of selecting one of a plurality of classifications. C4. The optical reader of claim C1, wherein the color imaging data is converted into a gray scale image in the process of selecting one of a plurality of classifications. C5. The optical reader of claim C1, wherein the processor decodes a ID bar code symbol. C6. The optical reader of claim C1, wherein the processor decodes a 2D bar code symbol. C7. The optical reader of claim C1, wherein the processor performs an optical character recognition process. C8. The optical reader of claim C1, wherein the processor performs a signature capture process. C9. The optical reader of claim C1, wherein the processor stores a color image in a computer-readable medium.

D1. An optical reader for capturing an image of an object, the optical reader comprising: a color imaging assembly for capturing the image as color imaging data; a user mode selector coupled to the color imaging assembly, the user mode selector being switchable between at least one automatic user mode, or a manual user mode for manually selecting one of a plurality of imaging modes of the optical reader, whereby the plurality of imaging modes includes at least one graphical symbol mode and a color photography mode; an automatic imaging mode selector coupled to the user mode selector and the color imaging assembly, the automatic imaging mode selector being operative to automatically select one of the plurality of imaging modes when in the automatic user mode; and a processing circuit coupled to the user mode selector and the automatic mode selector, the processing circuit being programmed to process the color imaging data based on the selected one of the plurality of operational modes. D2. The optical reader of claim D1, wherein the plurality of imaging modes includes a 1D bar code decoding mode. D3. The optical reader of claim D1, wherein the plurality of imaging modes includes a 2D bar code decoding mode. D4. The optical reader of claim D1, wherein the plurality of imaging modes includes an optical character recognition mode. D5. The optical reader of claim D1, wherein the plurality of imaging modes includes a signature capture mode. D6. The optical reader of claim D1, wherein the plurality of imaging modes includes a color photography mode.

E1. A method for acquiring an image of an object with an optical reader, the method comprising: acquiring first color imaging data representing the image; analyzing the color imaging data to provide an image classification, whereby the image is classified as a color photograph, or as including at least one graphical symbol; and processing the color imaging data in accordance with the image classification. E2. The method of claim E1, wherein the step of processing includes decoding a 1D barcode. E3. The method of claim E1, wherein the step of processing includes decoding a 2D barcode. E4. The method of claim E1, wherein the step of processing includes an optical character recognition process. E5. The method of claim E1, wherein the step of processing includes capturing a signature. E6. The method of claim E1, wherein the step of processing includes storing a color photographic image in a computer-readable medium. E7. The method of claim E1, wherein the step of analyzing includes an analysis of only one color of the color imaging data during the step of providing an image classification. E8. The method of claim E1, further comprising: acquiring at least one second color imaging data representing at least one second image; analyzing the at least one second color imaging data to provide at least one second image classification, whereby the at least one second image is classified as a color photograph, or as an image including at least one graphical symbol; processing the at least one second color imaging data in accordance with the at least one second image classification; and associating the at least one second color imaging data with the first color imaging data. E9. The method of claim E1, wherein the step of associating includes displaying the at least one second color imaging data with the first color imaging data. E10. The method of claim E9, wherein the step of associating includes electronically displaying the at least one second color imaging data with the first color imaging data. E11. The method of claim E1 wherein the step of associating includes printing the at least one second color imaging data with the first color imaging data. E12. The method of claim E1, wherein the step of associating includes linking the at least one second color imaging data with the first color imaging data in memory. E13. The method of claim E1, wherein the step of associating includes storing the at least one second color imaging data with the first color imaging data as a record in a database.

F1. A computer readable medium having computer-executable instructions for performing a method comprising: acquiring color imaging data; analyzing the color imaging data to provide an image classification, whereby the image is classified as a color photograph, or the image is classified as including at least one graphical symbol; and processing the color imaging data in accordance with the image classification.

G1. In an optical reader having a color imaging assembly for acquiring color imaging data, and a graphical user interface including a display and a selection device, a method for selecting at least one optical reader operating mode, the method comprising: displaying at least one icon on the graphical user interface, the at least one icon corresponding to the at least one optical reader operating mode; clicking on the at least one icon with the selection device to thereby select the at least one optical reader operating mode corresponding to the selected at least one icon; and processing the color imaging data based on the selected at least one icon, whereby the color imaging data is processed as a color photographic image, or as an image that includes at least one graphical symbol.

H1. In an optical reader having a color imaging assembly for acquiring color imaging data, and a graphical user interface including a display and a selection device, a method of providing and selecting from a menu on the display, the method comprising: retrieving a set of menu entries for the menu, each of the menu entries representing at least one operational mode of the optical reader; displaying the set of menu entries on the display; selecting a menu entry; emitting a menu selection signal indicative of a selected operational mode; and processing the imaging data based on the selected menu entry, whereby the, imaging data is processed as a color photographic image or as an image that includes at least one graphical symbol.

I1. A method for acquiring an image of an object with an optical reader, the method comprising: providing a color imaging assembly; converting the image into color imaging data; classifying the image as either a color photograph, or as a color image that includes at least one graphical symbol; and processing the color imaging data in accordance with the step of classifying.

J1. A method for acquiring an image of an object with an optical reader, the optical reader having a plurality of imaging modes including at least one graphical symbol mode, and a color photography mode, the method comprising: capturing the image by acquiring color imaging data; analyzing at least a portion of the color imaging data to provide an image classification, whereby the image classification includes at least one graphical symbol classification and a color photography classification; automatically selecting one of a plurality of image processing modes based on the image classification provided in the step of analyzing; and processing the color imaging data based on the selected one of the plurality of image processing modes.

K1. A method for acquiring an image of an object with an optical reader, the optical reader having a plurality of imaging modes including at least one graphical symbol mode, and a color photography mode, the method comprising: capturing the image by acquiring color imaging data; automatically selecting one of the plurality of imaging modes based on an analysis of the color imaging data; and processing the color imaging data in accordance with a selected one of the plurality of imaging modes.

L1. A system for processing at least one image, the system including at least one network element, the system comprising: an optical reader including a color imager and a processor, the color imager being configured to capture the at least one image by generating color imaging data corresponding to the at least one image, the processor being configured to provide a classification of the color imaging data based on whether the color imaging data includes at least one graphical symbol, the processor being programmed to process the color imaging data in accordance with the classification; and a network coupled to the color optical reader and the at least one network element, whereby processed image data is transmitted between the network and the at least one network element. L2. The system of claim L1, wherein the network includes the Internet. L3. The system of claim L1, wherein the network includes a wireless network. L4. The system of claim L1, wherein the network includes a circuit switched network. L5. The system of claim L1, wherein the network includes an IP network. L6. The system of claim L1, wherein the network includes a private network. L7. The system of claim L1, wherein the network element includes a LAN. L8. The system of claim L7, wherein the LAN further comprises: a server coupled to the network; and at least one optical reader coupled to the server. L9. The system of claim L7, wherein the at least one optical reader includes a color imager. L10. The system of claim L7, wherein the LAN includes a database, the database being configured to store a plurality of associated processed images. L11. The system of claim L8, wherein the plurality of associated processed images includes a color photographic image associated with decoded bar code data. L12. The system of claim L8, wherein the plurality of associated processed images includes a color photographic image associated with decoded OCR data. L13. The system of claim L8, wherein the plurality of associated processed images includes a color photographic image associated with decoded text data. L14. The system of claim L8, wherein the plurality of associated processed images includes a color photographic image associated with a captured signature. L15. The system of claim L8, wherein the plurality of associated processed images includes decoded bar code data. L16. The system of claim L8, wherein the plurality of associated processed images includes decoded OCR data. L17. The system of claim L8, wherein the plurality of associated processed images includes decoded text data. L18. The system of claim L8, wherein the plurality of associated processed images includes a captured signature. L19. The system of claim L7, wherein the LAN includes a POS terminal. L20. The system of claim L7, wherein the LAN includes a credit card authentication module. L21. The system of claim L7, wherein the LAN includes a signature verification module. L22. The system of claim L1, wherein the network element includes a PAN, the Pan having at least one optical reader coupled thereto. L23. The system of claim L22, wherein the at least one optical reader includes a color imager. L24. The system of claim L22, wherein the PAN includes a POS terminal. L25. The system of claim L1, wherein the network element further comprises: a wireless base station coupled to the network, the wireless base station being configured to transmit and receive processed image data to and from the network; and at least one wireless optical reader coupled to the wireless base station via an RF communications link. L26. The system of claim L25, wherein the at least one wireless optical reader includes a color imager. L27. The system of claim L1, wherein the processor further comprises an image analysis circuit coupled to the color imager, the image analysis circuit being configured to determine if the color imaging data includes at least one graphical symbol, whereby the image is classified as a graphical symbol image if the color imaging data includes at least one graphical symbol, or the image is classified as a color photograph if the color imaging data does not include at least one graphical symbol. L28. The system of claim L1, wherein the processor further comprises an automatic mode selection circuit coupled to the color imager, the automatic mode selection circuit using at least a portion of the color imaging data to select one of a plurality of operational modes of the optical reader, the operational modes including at least graphical symbol mode and a color photography mode. L29. The system of claim L1, wherein the processor further comprises: a classification circuit coupled to the color imager, the classification circuit being configured to process at least a portion of the color imaging data to thereby select one of a plurality of classifications, whereby the image is classified as a color photographic image, or as an image that includes at least one graphical symbol; an automatic mode selector coupled to the classification circuit, the automatic mode selector being configured to select an optical reader mode in accordance with the selected one of a plurality of classifications. L30. The system of claim L1, wherein the optical reader further comprises: a user mode selector coupled to the color imager, the user mode selector being switchable between at least one automatic user mode, or a manual user mode for manually selecting one of a plurality of imaging modes of the optical reader, whereby the plurality of imaging modes includes at least one graphical symbol mode and a color photography mode; an automatic imaging mode selector coupled to the user mode selector and the color imager, the automatic imaging mode selector being operative to automatically select one of the plurality of imaging modes when in the automatic user mode.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A method comprising:
   capturing a first color image utilizing a hand held device;
   utilizing the hand held device, capturing a second color image, the second color image including a representation of an optical indicia;
   decoding the optical indicia utilizing the second color image to thereby generate decoded data;
   associating the decoded data to the first color image so that the decoded data and the first color image are electronically associated to one another.

2. The method of claim 1, wherein the method includes electronically displaying the decoded data with the first color image.

3. The method of claim 1, wherein the method includes electronically displaying on a display of the hand held device the decoded data with the first color image.

4. The method of claim 1, wherein the capturing of the second color image is performed subsequent to the capturing of the first color image.

5. The method of claim 1, wherein the first color image and said second color image correspond to different views of a common item.

6. The method of claim 1, wherein the first color image is of a parcel for delivery, and wherein the second color image includes a representation of an optical indicia included on the parcel for delivery.

7. The method of claim 1, wherein said method further includes counting a number of color images that have been captured, and presenting a user a prompt responsively to the counting.

8. The method of claim 1, wherein the method includes capturing a first color image utilizing a hand held device that includes a display.

9. The method of claim 8, wherein the method includes electronically displaying the decoded data with the first color image.

10. The method of claim 8, wherein the capturing of the second color image is performed subsequent to the capturing of the first color image.

11. The method of claim 8, wherein the first color image and said second color image correspond to different views of a common item.

12. The method of claim 8, wherein the first color image is of a parcel for delivery, and wherein the second color image includes a representation of an optical indicia included on the parcel for delivery.

13. The method of claim 8, wherein said method further includes counting a number of color images that have been captured, and presenting a user a prompt responsively to the counting.

14. The method of claim 2, wherein the displaying includes displaying externally from the hand held device.

* * * * *